US009459644B2

(12) United States Patent
Kinugasa et al.

(10) Patent No.: US 9,459,644 B2
(45) Date of Patent: Oct. 4, 2016

(54) ENERGY CONTROL DEVICE

(71) Applicant: DAIKIN INDUSTRIES, LTD., Osaka-shi, Osaka (JP)

(72) Inventors: Nanae Kinugasa, Kusatsu (JP); Seiji Kawai, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 261 days.

(21) Appl. No.: 14/371,710

(22) PCT Filed: Jan. 9, 2013

(86) PCT No.: PCT/JP2013/050163
§ 371 (c)(1),
(2) Date: Jul. 10, 2014

(87) PCT Pub. No.: WO2013/105567
PCT Pub. Date: Jul. 18, 2013

(65) Prior Publication Data
US 2015/0005969 A1 Jan. 1, 2015

(30) Foreign Application Priority Data

Jan. 13, 2012 (JP) ................................. 2012-004608

(51) Int. Cl.
*G06F 19/00* (2011.01)
*G05F 1/66* (2006.01)
(Continued)

(52) U.S. Cl.
CPC ................ *G05F 1/66* (2013.01); *F24F 3/065* (2013.01); *F24F 11/006* (2013.01); *G05B 15/02* (2013.01); *F24F 2011/0075* (2013.01)

(58) Field of Classification Search
CPC .......... G05F 1/66; G05B 15/02; F24F 3/065; F24F 11/006; F24F 2011/0075
USPC ....................................................... 700/291
See application file for complete search history.

(56) References Cited

U.S. PATENT DOCUMENTS 5,572,438 A * 11/1996 Ehlers .................. G01R 21/133
 307/37
8,340,832 B1 * 12/2012 Nacke ....................... H02J 3/14
 700/286
(Continued)

FOREIGN PATENT DOCUMENTS

JP 10-30834 A 2/1998
JP 2000-78748 A 3/2000
(Continued)

OTHER PUBLICATIONS

Ozturk, Yusuf, et al. "An intelligent home energy management system to improve demand response." Smart Grid, IEEE Transactions on 4.2 (2013): 694-701.*
(Continued)

*Primary Examiner* — Michael D Masinick
(74) *Attorney, Agent, or Firm* — Global IP Counselors

(57) ABSTRACT

An energy control device adjusts an amount of energy of a plurality of pieces of equipment placed at a property. The energy control device includes a receiving unit, a basic adjustable amount calculation unit, and a control instruction generation unit. The receiving unit receives an energy suppression request including information related to a requested suppressed amount of energy at the property. The calculation unit calculates, upon receipt of the energy suppression request, a basic adjustable amount of energy for each piece of equipment independently of the requested suppressed amount based on an operating status of the piece of equipment when the energy suppression request is received. The generation unit instructs the equipment to perform energy amount adjustment control so that a total of suppressed amounts of energy at the property becomes equal to the requested suppressed amount based on the basic adjustable amount of energy for each piece of equipment.

15 Claims, 15 Drawing Sheets

(51) Int. Cl.
*F24F 3/06* (2006.01)
*F24F 11/00* (2006.01)
*G05B 15/02* (2006.01)

(56) References Cited

U.S. PATENT DOCUMENTS

| | | | | |
|---|---|---|---|---|
| 2002/0162032 | A1* | 10/2002 | Gundersen | H02J 3/14 713/300 |
| 2005/0102068 | A1 | 5/2005 | Pimputkar et al. | |
| 2010/0324962 | A1 | 12/2010 | Nesler et al. | |
| 2011/0106328 | A1* | 5/2011 | Zhou | G05B 13/024 700/291 |
| 2012/0065805 | A1* | 3/2012 | Montalvo | G06Q 10/06 700/297 |
| 2012/0330469 | A1* | 12/2012 | Kinugasa | H02J 3/14 700/286 |
| 2013/0184892 | A1* | 7/2013 | Mohan | G05B 15/02 700/297 |
| 2014/0148960 | A1* | 5/2014 | Bhageria | G05B 15/02 700/286 |
| 2015/0253752 | A1* | 9/2015 | Kondo | H02J 3/14 700/291 |

FOREIGN PATENT DOCUMENTS

| | | |
|---|---|---|
| JP | 2005-107901 A | 4/2005 |
| JP | 2009-204188 A | 9/2009 |
| JP | 2011-239470 A | 11/2011 |
| WO | 2011/111477 A1 | 9/2011 |

OTHER PUBLICATIONS

Lujano-Rojas, Juan M., et al. "Optimum residential load management strategy for real time pricing (RTP) demand response programs." Energy Policy 45 (2012): 671-679.*

Shao, Shengnan, Manisa Pipattanasomporn, and Saifur Rahman. "Grid integration of electric vehicles and demand response with customer choice." Smart Grid, IEEE Transactions on 3.1 (2012): 543-550.*

Sæle, Hanne, and Ove S. Grande. "Demand response from household customers: experiences from a pilot study in Norway." Smart Grid, IEEE Transactions on 2.1 (2011): 102-109.*

Xiong, Gang, et al. "Smart (in-home) power scheduling for demand response on the smart grid." Innovative smart grid technologies (ISGT), 2011 IEEE Pes. IEEE, 2011.*

International Search Report of corresponding PCT Application No. PCT/JP2013/050163 dated Mar. 26, 2013.

International Preliminary Report of corresponding PCT Application No. PCT/JP2013/050163 dated Jul. 24, 2014.

European Search Report of corresponding EP Application No. 13 73 5935.2 date May 17, 2016.

* cited by examiner

|   | MAINTAINABLE TIME (MINUTES) | ALLOWED OPERATING CAPACITY (%) |
|---|---|---|
| A | 60 | 80 |
| B | 30 | 60 |
| C | 15 | 40 |

FIG. 4(a)

|   | MAINTAINABLE TIME (MINUTES) | ALLOWED OPERATING CAPACITY (%) |
|---|---|---|
| A | 60 | 60 |
| B | 30 | 40 |
| C | 15 | 20 |

FIG. 4(b)

| DECISION OF COMFORT/DISCOMFORT FOR EACH INDOOR UNIT ||  |
|---|---|---|
| RANK || DEGREE OF DEGRADATION |
| ↑ COMFORTABLE | 1 | <1 |
| | 2 | 1≤, <2 |
| UNCOMFORTABLE ↓ | 3 | 2≤, <3 |
| | 4 | 3≤ |

FIG. 7

| DECISION OF COMFORT/DISCOMFORT FOR EACH OUTDOOR UNIT | | |
|---|---|---|
| RANK | | OCCURRENCE RATE OF INDOOR UNITS HAVING 3 OR LARGER NUMBER OF DEGRADATION RANK (WITHIN SAME SYSTEM) |
| ↑ COMFORTABLE | 1 | <20% |
| | 2 | 20%≦, <40% |
| | 3 | 40%≦, <60% |
| UNCOMFORTABLE ↓ | 4 | 60%≦, <80% |
| | 5 | 80%≦ |

FIG. 8

|   | MAINTAINABLE TIME (MINUTES) | ALLOWED OPERATING CAPACITY (%) <br> INTENSITY OF ENERGY SUPPRESSION CONTROL | | |
|---|---|---|---|---|
|   |   | LOW | MODERATE | HIGH |
| A | 60 | 90 | 80 | 70 |
| B | 30 | 70 | 60 | 50 |
| C | 15 | 50 | 40 | 30 |

FIG. 9

ENERGY CONTROL DEVICE

CROSS-REFERENCE TO RELATED APPLICATIONS

This U.S. National stage application claims priority under 35 U.S.C. §119(a) to Japanese Patent Application No. 2012-004608, filed in Japan on Jan. 13, 2012, the entire contents of which are hereby incorporated herein by reference.

TECHNICAL HELD

The present invention relates to an energy control device.

BACKGROUND ART

Energy suppliers may request users to suppress the usage of energy so that the amount of energy can be adjusted in the users' equipment for the purpose of improvement of efficiency of existing energy supply equipment, stable supply, of energy, global environment protection, and the like.

For example, Japanese Laid-open Patent Application No. 2005-107901 proposes a system in which the power is adjusted by suspending users' equipment based on needs of the power supplier and according to a priority order concerning the suspension of the equipment established in advance by the users upon request of a power supplier due to the tight supply-demand balance of the electric power.

SUMMARY

Problem to be Solved by the Invention

However, in the system described in Japanese Laid-open Patent Application No. 2005-107901, the operating status of the equipment at the time of adjusting the amount of energy is not considered. Therefore, in reality, a situation may arise in which the adjustment of the planned amount of energy cannot be carried out immediately considering the operating status of the equipment. In this case, it is not possible to immediately respond to the request for suppression of the amount of energy from the energy supplier.

Also in the system described in Japanese Patent Application No. 2005-107901, user comfort at the time of adjusting the amount of energy is not considered, and therefore there is a possibility of significantly impairing user comfort by suppressing the amount of energy.

An object of the present invention is to provide an energy control device that can rapidly respond to an energy suppression request provided from an energy supplier and can satisfy user comfort.

Means for Solving the Problem

The energy control device according to a first aspect of the present invention is an energy control device for adjusting an amount of energy of a plurality of pieces of equipment placed at a property, and comprises a receiving unit, a basic adjustable amount calculation unit, and a control instruction generation unit. The receiving unit receives an energy suppression request including information related to a requested suppressed amount of energy that is an amount of energy to be suppressed at the property. The basic adjustable amount calculation unit calculates, upon receipt of the energy suppression request, a basic adjustable amount of energy for each of the pieces of equipment independently of the requested suppressed amount of energy on the basis of an operating status of the equipment at the time when the energy suppression request is received. The control instruction generation unit instructs the equipment to perform energy amount adjustment control so that a total of suppressed amounts of energy at the property becomes equal to the requested suppressed amount of energy on the basis of the basic adjustable amount of energy for each of the pieces of equipment.

"Information related to a requested suppressed amount of energy" is not necessarily a requested suppressed amount of energy per se, but may be information with which the energy control device recognize a requested suppressed amount of energy.

Here, the basic adjustable amount of energy for each of the pieces of equipment based on the operating status of the equipment at the time of receiving the energy suppression request is calculated independently of the requested suppressed amount of energy upon receipt of the energy suppression request, and energy amount adjustment of each piece of equipment is performed on the basis of the basic adjustable amount of energy. As a result, the equipment placed at the property can suppress the requested suppressed amount of energy quickly and user comfort is unlikely to be impaired when the energy amount adjustment control is executed in the equipment.

The energy control device according to a second aspect of the present invention is the energy control device according to the first aspect, further comprising a difference amount calculation unit and a distribution unit. The difference amount calculation unit calculates as an energy difference amount a difference between a total of the basic adjustable amounts of energy for each of the pieces of equipment and the requested suppressed amount of energy. The distribution unit distributes the energy difference amount to the equipment. The control instruction generation unit instructs the equipment to perform the energy amount adjustment control on the basis of the basic adjustable amount of energy for each of the pieces of equipment and a result of the distribution of the energy difference amount performed by the distribution unit.

Here, the requested suppressed amounts of energy are not directly distributed to the equipment, but the difference between the total of the basic adjustable amounts of energy and the requested suppressed amount of energy is calculated as an energy difference amount, and the calculated energy difference amount is distributed to the equipment. Accordingly, the amount of energy distributed to each piece of equipment easily become a smaller value compared to when the requested suppressed amount of energy is directly distributed to the equipment. As a result, it is possible to respond with good precision to the requested suppressed amount of energy immediately after receiving the energy suppression request.

The energy control device according to a third aspect of the present invention is the energy control device according to the second aspect, further comprising a first storage unit. The first storage unit stores information of user comfort/discomfort associated with the equipment. The distribution unit distributes the energy difference amount to the equipment on the basis of the information of user comfort/discomfort.

Here, because the distribution of the energy difference amount is performed on the basis of the information of user comfort/discomfort stored in the first storage unit, it is possible to respond to the energy suppression request without impairing user comfort.

The energy control device according to a fourth aspect of the present invention is the energy control device according to the second aspect, further comprising a comfort/discomfort decision unit. The comfort/discomfort decision unit decides on user comfort/discomfort associated with the equipment. The distribution unit distributes the energy difference amount to the equipment on the basis of the information of user comfort/discomfort.

Here, because the distribution of the energy difference amount is performed on the basis of the user comfort/discomfort decided in the comfort/discomfort decision unit, it is possible to respond to the energy suppression request without impairing user comfort.

The energy control device according to a fifth aspect of the present invention is the energy control device according to the second to fourth aspects, wherein the basic adjustable amount calculation unit calculates a plurality of basic adjustable amounts of energy for each of the pieces of equipment. The difference amount calculation unit calculates a plurality of energy difference amounts from differences between totals of a plurality of basic adjustable amounts of energy and the requested suppressed amount of energy. The distribution unit distributes to the equipment a smallest energy difference amount that is the smallest among the energy difference amounts.

Here, because the energy difference amount by which the difference between the total of the basic adjustable amounts of energy and the requested suppressed amount of energy becomes smallest is distributed, it is possible to respond with good precision to the requested suppressed amount of energy immediately after receiving the energy suppression request.

The energy control device according to a sixth aspect of the present invention is the energy control device according to the first aspect, wherein the basic adjustable amount calculation unit calculates a plurality of basic adjustable amounts of energy for each of the pieces of equipment. The control instruction generation unit instructs the equipment to perform the energy amount adjustment control using a combination of the basic adjustable amounts of energy for each of the pieces of equipment in which a difference between a total of the basic adjustable amounts of energy for each of the pieces of equipment and the requested suppressed amount of energy is smallest.

Here, because the energy amount adjustment control is executed using a combination of the basic adjustable amounts of energy in which the difference with the requested suppressed amount of energy is smallest, it is possible to respond with good precision to the requested suppressed amount of energy immediately after receiving the energy suppression request.

The energy control device according to a seventh aspect of the present invention is the energy control device according to the sixth aspect, further comprising a first storage unit. The first storage unit stores information of user comfort/discomfort associated with the equipment. The control instruction generation unit, when there are a plurality of combinations of the basic adjustable amounts of energy for each of the pieces of equipment in which the difference between the total of the basic adjustable amounts of energy for each of the pieces of equipment and the requested suppressed amount of energy is smallest, decides on one combination of the basic adjustable amounts of energy on the basis of the information of user comfort/discomfort, and instructs the equipment to perform the energy amount adjustment control.

Here, because the combination of the basic adjustable amounts of energy is decided on the basis of the information of user comfort/discomfort stored in the first storage unit, it is possible to respond to the energy suppression request without impairing user comfort.

The energy control device according to an eighth aspect of the present invention is the energy control device according to the sixth aspect, further comprising a comfort/discomfort decision unit. The comfort/discomfort decision unit decides on user comfort/discomfort associated with the equipment. The control instruction generation unit decides on one combination of the basic adjustable amounts of energy on the basis of the information of user comfort/discomfort when there are a plurality of combinations of the basic adjustable amounts of energy for each of the pieces of equipment in which the difference between the total of the basic adjustable amounts of energy for each of the pieces of equipment and the requested suppressed amount of energy is smallest, and instructs the equipment to perform the energy amount adjustment control.

Here, because the combination of the basic adjustable amounts of energy is decided on the basis of the user comfort/discomfort decided by the comfort/discomfort decision unit, it is possible to respond to the energy suppression request without impairing user comfort.

The energy control device according to a ninth aspect of the present invention is the energy control device according to the first to eighth aspects, wherein the receiving unit receives the energy suppression request from an energy management device. The energy control device further comprises a reference adjustable amount calculation unit and a presentation unit. The reference adjustable amount calculation unit calculates as a reference adjustable amount of energy a total of adjustable amounts of energy of the equipment in a first operating status. The presentation unit presents the reference adjustable amount of energy to the energy management device prior to the energy suppression request.

Here, because the reference adjustable amount of energy is presented to the energy management device prior to the energy suppression request, a feasible energy suppression request is easily presented to the energy control device from the energy management device. As a result, the equipment can more easily respond immediately to the requested suppressed amount of energy. Suppression of the amount of energy also can be executed within an extent in which user comfort is not impaired.

The energy control device according to a tenth aspect of the present invention is the energy control device according to the ninth aspect, the requested suppressed amount of energy is less than or equal to the reference adjustable amount of energy.

As a result, the energy amount adjustment is more easily executed in response to the requested suppressed amount of energy, and user comfort is also unlikely to be impaired.

The energy control device according to an eleventh aspect of the present invention is the energy control device according to the first to eighth aspects, wherein the receiving unit receives the energy suppression request from an energy management device. The energy control device further comprises a reference demand value calculation unit and a presentation unit. The reference demand value calculation unit calculates as a reference demand value a demand value achievable by the equipment in a first operating status. The presentation unit presents the reference demand value to the energy management device prior to the energy suppression request. "Demand value" here indicates a maximum value of the amount of energy used per unit time at the property.

Here, because the reference demand value is presented to the energy management device prior to the energy suppression request, a feasible energy suppression request is easily presented from the energy management device. As a result, the equipment can more easily respond immediately to the requested suppressed amount of energy. Suppression of the amount of energy also can be executed within an extent in which user comfort is not impaired.

The energy control device according to a twelfth aspect of the present invention is the energy control device according to the eleventh aspect, wherein the requested suppressed amount of energy is less than or equal to a value obtained by subtracting the reference demand value from an amount of energy being used by the equipment at the time when the energy suppression request is received.

As a result, the energy amount adjustment is more easily executed in response to the requested suppressed amount of energy, and user comfort also is unlikely to be impaired.

The energy control device according to a thirteenth aspect of the present invention is the energy control device according to the first to eighth aspects, further comprising a second storage unit. The second storage unit stores information related to an energy supply-demand contract with an energy supplier supplying energy to the property. The energy suppression request including information related to the requested suppressed amount of energy calls the information related to the requested suppressed amount of energy defined in the energy supply-demand contract from the second storage unit.

Here, appropriate energy amount adjustment is possible even when the requested suppressed amount of energy cannot be directly transmitted to the energy control device from the energy management device.

Effects of Invention

In the energy control device according to the first aspect of the present invention, the basic adjustable amount of energy for each of the pieces of equipment based on the operating status of the equipment at the time of receiving the energy suppression request is calculated independently of the requested suppressed amount of energy upon receipt of the energy suppression request, and energy amount adjustment of each piece of equipment is performed on the basis of the basic adjustable amount of energy. As a result, the equipment placed at the property can suppress the requested suppressed amount of energy quickly, and user comfort is unlikely to be impaired when the energy amount adjustment is executed in the equipment.

In the energy control device according to the second aspect of the present invention, it is possible to respond with good precision to the requested suppressed amount of energy immediately after receiving the energy suppression request.

In the energy control device according to the third and fourth aspects of the present invention, it is possible to respond to the energy suppression request without impairing user comfort.

In the energy control device according to the fifth and sixth aspects of the present invention, it is possible to respond with good precision to the requested suppressed amount of energy immediately after receiving the energy suppression request.

In the energy control device according to the seventh and eighth aspects of the present invention, it is possible to respond to the energy suppression request without impairing user comfort.

In the energy control device according to the ninth to twelfth aspects of the present invention, the energy amount adjustment in response to the requested suppressed amount of energy is possible, and user comfort is unlikely to be impaired.

In the energy control device according to the thirteenth aspect of the present invention, appropriate energy amount adjustment is possible even when the requested suppressed amount of energy cannot be directly transmitted to the energy control device from the energy management device.

BRIEF DESCRIPTION OF THE DRAWINGS

FIG. 4 is a diagram illustrating one example of the conditions stored in the condition memory area of the energy control device according to the first embodiment of the present invention. (a) illustrates the conditions corresponding to a case in which the operating capacity during calculation is 100%, and (b) illustrates the conditions corresponding to a case in which the operating capacity during calculation is 80%.

FIG. 7 is a diagram illustrating an example of the first map stored in the map memory area according to modified example 1A.

FIG. 8 is a diagram illustrating an example of the second map stored in the map memory area according to modified example 1A.

FIG. 9 is a diagram illustrating an example of the conditions stored in the condition memory area according to modified example 1C and the second embodiment. The conditions corresponding to intensities "low," "moderate," and "high" of energy suppression control are provided. FIG. 9 illustrates an example of the conditions in the case in which the operating capacity of the air conditioner during calculation is 100%.

DESCRIPTION OF EMBODIMENTS

First Embodiment

Figure 1:
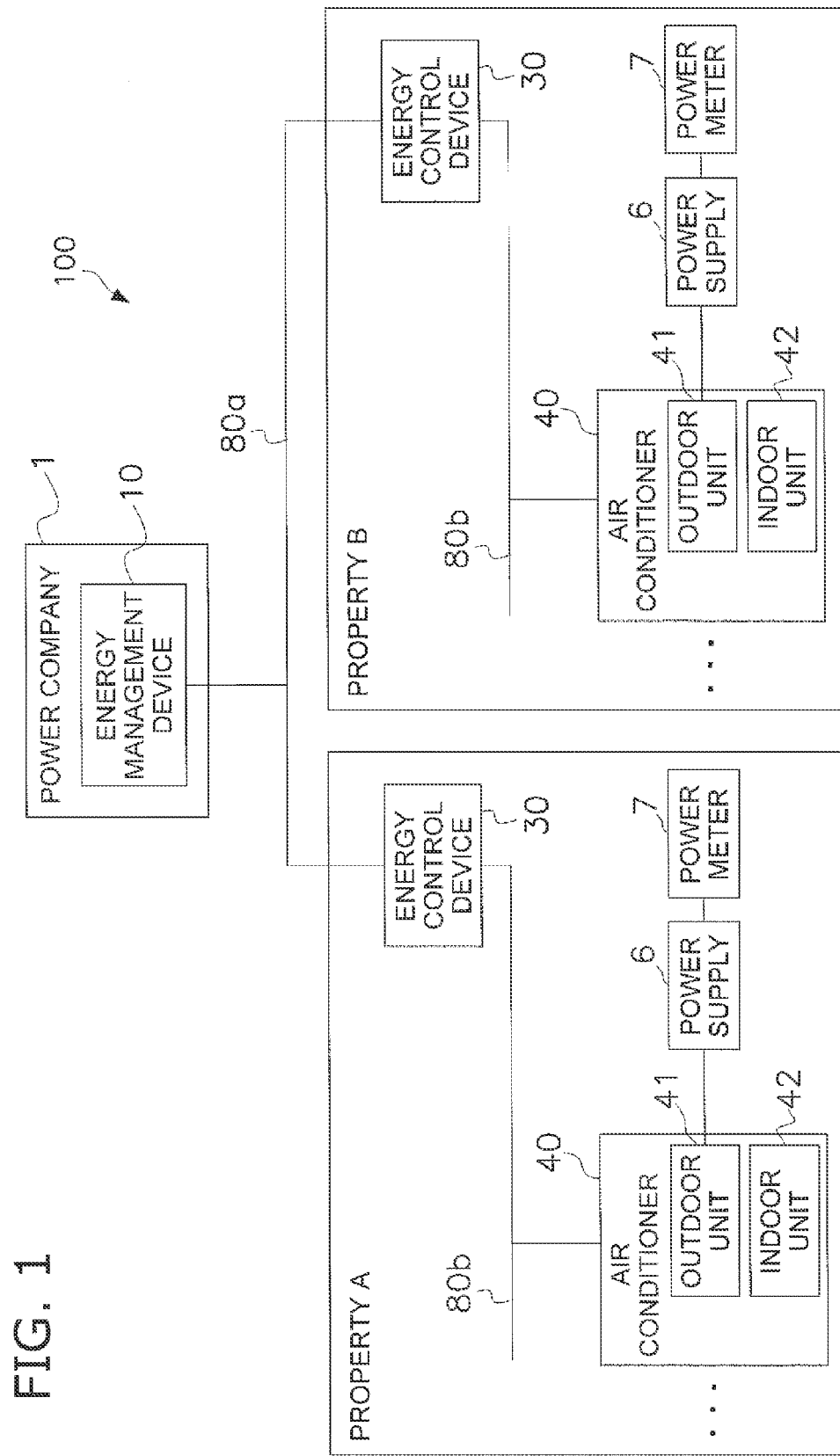
FIG. 1 is a general configuration diagram of the energy management system according to the first embodiment of the present invention.

An energy management system 100 according to a first embodiment of the present invention is described below while referring to the drawings.

(1) General Configuration of the Entirety of the Energy Management System 100

FIG. 1 illustrates the energy management system 100 according to the present embodiment. In the energy management system 100, power is supplied from a power company 1 to properties A and B. The properties A and B are buildings, such as office buildings, buildings with leased commercial space, factories, common homes, and others, in which a plurality of pieces of equipment are installed. In FIG. 1, only two properties A and B are depicted as properties to which power is supplied by the power company, but the number of properties is not limited to two.

The power company 1 has an energy management device 10. The properties A and B have energy control devices 30, 30 for equipment, a plurality of pieces of equipment, power supplies 6, 6 for supplying power to the equipment, and power meters 7, 7 for metering power and/or an amount of power supplied from the power supplies 6, 6 to the equipment. The plurality of pieces of equipment include air conditioners 40, 40, . . . . The air conditioners 40, 40, . . . have outdoor units 41, 41, . . . , indoor units 42, 42, . . . , and refrigerant piping (not illustrated) connecting the outdoor units 41, 41, . . . and the indoor units 42, 42, . . . . The air conditioners 40, 40, . . . may be multiple-type or pair-type. The energy management device 10 and the energy control devices 30, 30 are connected via the Internet 80a. The energy control device 30 and the equipment in the same property are connected via a dedicated control line 80b.

The energy control devices 30, 30 in the properties A and B transmit via the Internet 80a and present to the power company 1 one or a plurality of combinations of reference adjustable amounts of energy and maintainable times. "Reference adjustable amount of energy" is power that is reducible at the properties A or B during the maintainable time. The reference adjustable amount of power implies power that is not only physically reducible but that is thought to be such that an influence on user comfort can be suppressed within an allowed range when adjusting the power by that amount during the maintainable time. "Suppressing an influence on the indoor environment of the user within an allowed range" means, for example, suppressing deviation between state values of the indoor environment such as room temperature, humidity, and others and target values thereof within a prescribed range.

The energy management device 10 of the power company 1 selects one maintainable time as a suppression request time and calculates a requested suppressed amount of energy for each property A and B on the basis of the transmitted combinations of the maintainable times and the reference adjustable amounts of energy. The energy management device 10 transmits via the internee 80a an energy suppression request including information of the suppression request time and the requested suppressed amount of energy. "Requested suppressed amount of energy" is power that the energy management device 10 requests the properties A and B to suppress, and is a value less than or equal to the reference adjustable amount of energy combined with the selected maintainable time. When the properties A and B cannot reduce the power by the amount of the requested suppressed amount of energy, for example, payment of a surcharge and/or forfeit for breach of contract, or another penalty is imposed on the properties A and B.

(2) Configuration of Each Device

The energy management device 10 and energy control devices 30, 30 included in the energy management system 100 are described below.

(2-1) Configuration of the Energy Management Device

Figure 2:
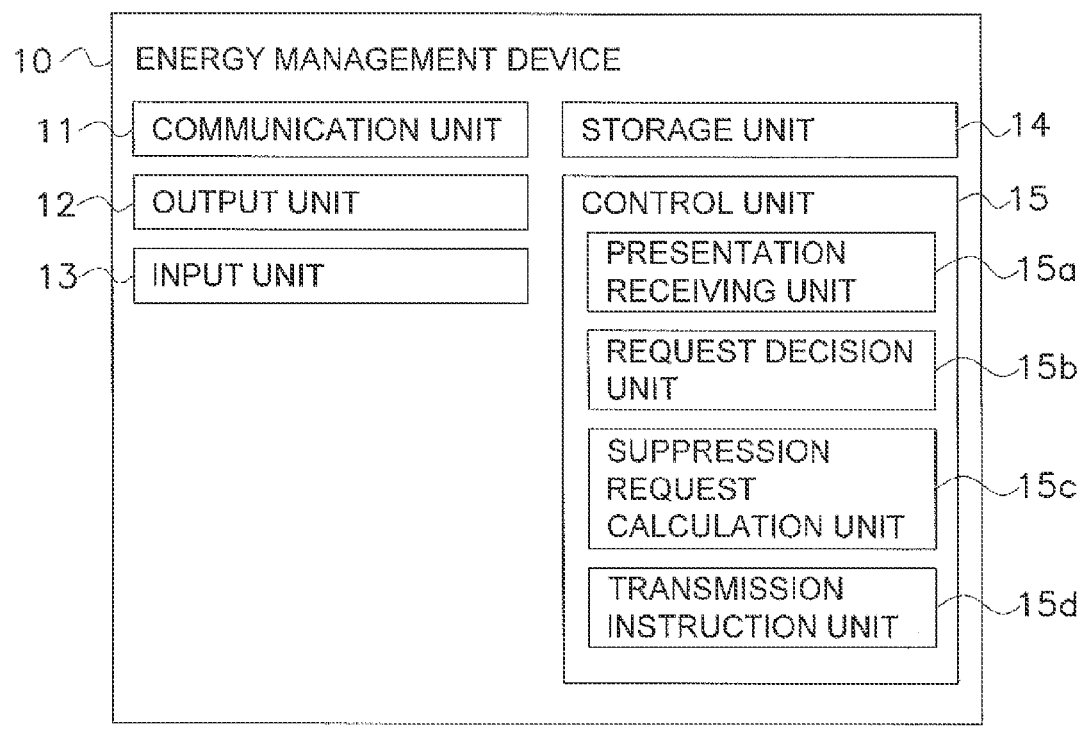
FIG. 2 is a general configuration diagram of the energy management device of a power company according to the first and second embodiments of the present invention.

FIG. 2 illustrates the general configuration of the energy management device 10.

The energy management device 10 is provided with a communication unit 11, an output unit 12, an input unit 13, a storage unit 14, and a control unit 15.

(2-1-1) Communication Unit

The communication 11 is a network interface for making the energy management device 10 connectable to the Internet 80a.

(2-1-2) Output Unit

The output unit 12 is mainly configured with a display. The output unit 12 displays management screen images illustrating various kinds of information stored in the storage unit 14 to be described later.

(2-1-3) Input Unit

The input unit 13 is mainly configured operating buttons, a keyboard, a mouse, and the like.

(2-1-4) Storage Unit

The storage unit 14 is mainly configured with a hard disk. The combinations of reference adjustable amounts of energy and maintainable times received from the energy control devices 30, 30 of the properties A and B are stored for each property in the storage unit 14.

(2-1-5) Control Unit

The control unit 15 is mainly configured with a CPU, a ROM, and a RAM. The control unit 15 mainly functions as a presentation receiving unit 15a, a request decision unit 15b, a suppression request calculation unit 15c, and a transmission instruction unit 15d, as illustrated in FIG. 2, by reading and executing programs stored in the abovementioned storage unit 14.

(2-1-5-1) Presentation Receiving Unit

The presentation receiving unit 15a receives the combinations of maintainable times and reference adjustable amounts of energy transmitted from the properties A and B.

(2-1-5-2) Request Decision Unit

The request decision unit 15b forecasts an amount of supply of power and an amount of demand of the entirety of the energy management system 100, and decides to make a request for suppression of energy to the properties A and B when it is determined that there is a possibility that the amount of demand may exceed the amount of supply after a prescribed time. The request decision unit 15b also calculates and decides on a suppression time to request energy suppression and a total amount of suppression of power to be suppressed as the entirety of the energy management system 100.

(2-1-5-3) Suppression Request Calculation Unit

The suppression request calculation unit 15c calculates a suppression request time and a requested suppressed amount of energy for each property on the basis of the combinations of reference adjustable amounts of energy and maintainable times for each property stored in the storage unit 14 and the suppression time and total amount of suppression decided in the request decision unit 15*b*.

"Suppression request time" is the time for suppression of energy requested to the properties A and B. One time is selected for each property A and B as suppression request time from the maintainable times presented by each property A and B.

The requested suppressed amount of energy is calculated so that the power can be suppressed by the total amount of suppression calculated in the request decision unit 15*b* as the entirety of the energy management system 100, assuming that all properties reduced power by the requested suppressed amount of energy transmitted together with the energy suppression request.

The requested suppressed amount of energy furthermore is a value less than or equal to the reference adjustable amount of energy paired with the maintainable time selected in the suppression request calculation unit 15*c*. This is described with a specific example.

For example, assume that the property A presented to the energy management device 10 three combinations of 60 minutes and 20 kW, 30 minutes and 40 kW, and 15 minutes and 60 kW as combinations of maintainable times and reference adjustable amounts of energy. Also assume that the suppression request calculation unit 15*c* selected the maintainable time of 30 minutes as the suppression request time for the property A. In this case, the suppression request calculation unit 15*c* calculates a value less than or equal to the reference adjustable amount of energy (40 kW) paired with the maintainable time of 30 minutes as the requested suppressed amount of energy for the property A.

(2-1-5-4) Transmission Instruction Unit

The transmission instruction unit 15*d* instructs the communication unit 11 to transmit to the properties A and B the suppression request time and the requested suppressed amount of energy decided in the suppression request calculation unit 15*c* together with the energy suppression request.

(2-2) Configuration of the Energy Control Device

Figure 3:
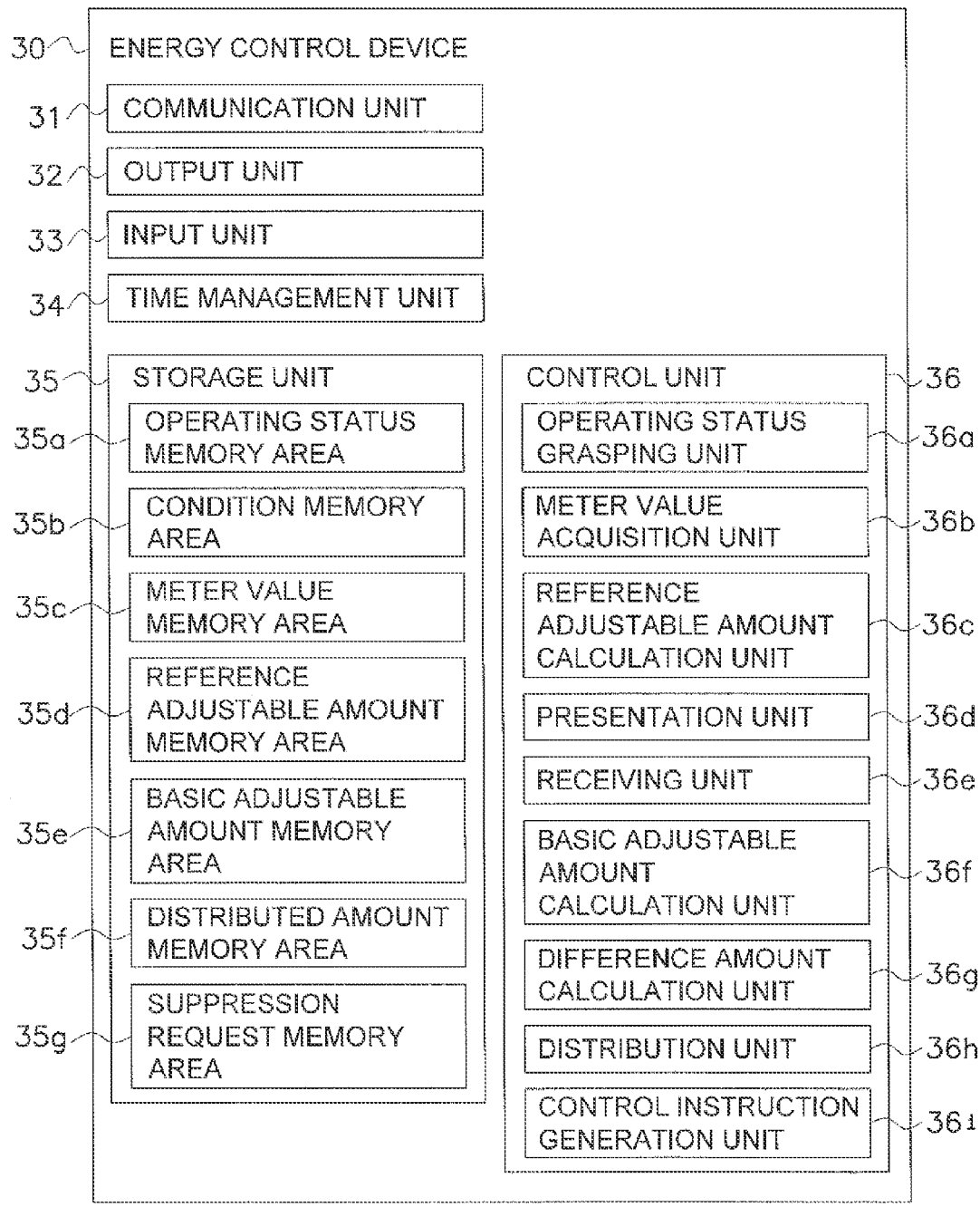
FIG. 3 is a general configuration diagram of the energy control device according to the first embodiment of the present invention.

FIG. 3 is a general configuration diagram of the energy control device 30, 30

The energy control devices 30, 30 placed at the properties A and B are described below with FIG. 3. The energy control device 30 placed at the property A is described in the description below. The energy control device 30 placed at the property B also has the same configuration.

The energy control device 30 mainly has a communication unit 31, an output unit 32, an input unit 33, a time management unit 34, a storage unit 35, and a control unit 36, as illustrated in FIG. 3.

(2-2-1) Communication Unit

The communication unit 31 is a network interface for making the energy control device 30 connectable to the Internet 80*a*.

(2-2-2) Output Unit

The output unit 32 is mainly configured with a display. Screen images indicating operating conditions (for example, operation/stop state, operating mode (cooling mode/heating mode, and the like), wind direction, wind volume, humidity, intake temperature, set temperature, and the like) of the air conditioners 40, 40, . . . are displayed to the output unit 32.

(2-2-3) Input Unit

The input unit 33 is mainly configured with a touch panel covering the abovementioned display. Buttons fir inputting start/stop signals for the air conditioners 40, 40, . . . , as well as various instructions to the air conditioners 40, 40, . . . including change of set temperature and change of operating mode, are arranged on the touch panel. An operator, or the like, touches the buttons on the touch panel, whereby control processing corresponding to the touched buttons is executed by the control unit 36.

(2-2-4) Time Management Unit

The time management unit 34 performs time management of the various kinds of control executed by the energy control device 30.

(2-2-5) Storage Unit

The storage unit 35 is configured with a hard disk, and the like, and has an operating status memory area 35*a*, a condition memory area 35*b*, a meter value memory area 35*c*, a reference adjustable amount memory area 35*d*, a basic adjustable amount memory area 35*e*, a distributed amount memory area 35*f*, and a suppression request memory area 35*g*.

(2-2-5-1) Operating Status Memory Area

The operating status of each air conditioner 40, 40, . . . grasped by an operating status grasping unit 36*a* to be described later is stored in the operating status memory area 35*a*. Operating statuses of the air conditioners 40, 40, . . . include: operation/stop state, set temperature, cooling/heating and other operating modes, operating time, operating rate, and operating capacity during operation of the air conditioners 40, 40, . . . ; various state values (rotation number of a fan, rotation number of a compressor, opening degree of an expansion valve, refrigerant temperature, refrigerant pressure, and the like) of the outdoor units 41, 41, . . . and the indoor units 42, 42, . . . ; an outdoor temperature, an indoor temperature, an intake temperature, allowed degree of deviation between a set temperature and the indoor temperature, execution/non-execution of energy adjustment control, and the like. Here, "operating capacity" during operation of the air conditioners 40, 40, . . . indicates the extent of capacity at which the air conditioners 40, 40, . . . (more precisely, mainly the compressors) are operated relative to a rated capacity of the air conditioners 40, 40, . . . .

(2-2-5-2) Condition Memory Area

Conditions for calculating a reference adjustable amount of energy and a basic adjustable amount of energy to be described later are stored for each air conditioner 40, 40, . . . in the condition memory area 35*b*. The conditions, specifically, are combinations of times for executing energy adjustment control (that is, maintainable times of energy adjustment control) (minutes) the operating capacities of the air conditioners 40, 40, . . . allowed during execution of the energy adjustment control (hereinafter referred to as "allowed operating capacity"), as illustrated in FIG. 4. A plurality of conditions furthermore are prepared for a parameter of the operating capacity of the air conditioners 40, 40, . . . at the time when the reference adjustable amount of energy or the basic adjustable amount of energy is calculated, as in FIGS. 4(*a*) and (*b*).

The allowed operating capacity included in the conditions is predefined so that the influence on the indoor environment of the user, for example, room temperature and/or humidity, is brought to within an allowed range when energy adjustment control is executed using these conditions. However, the conditions are not necessarily to be fixed, and may be updatable by input of a user from the input unit 33. The allowed operating capacity also may be obtained by a formula with a parameter of a part or the entirety of the operating statuses of the air conditioners 40, 40, . . . , and may be corrected upon learning of user comfort/discomfort.

The conditions in FIG. 4 are one example, and are not limited to these. For example, although a plurality of combinations of maintainable times and allowed operating capacities are stored as conditions, there may be only one combination. The conditions may also be those not depending on the operating capacity of the air conditioners 40, 40, . . . at the time when the reference adjustable amount of energy or the basic adjustable amount of energy is calculated.

(2-2-5-3) Meter Value Memory Area

A meter value acquired by a meter value acquisition unit 36b to be described later is stored for each air conditioner 40, 40, . . . in the meter value memory area 35c.

(2-2-5-4) Reference Adjustable Amount Memory Area

The reference adjustable amount of energy calculated by a reference adjustable amount calculation unit 36c to be described later is stored in combination with the maintainable time in the reference adjustable amount memory area 35d.

(2-2-5-5) Basic Adjustable Amount Memory Area

The basic adjustable amount of energy for each air conditioner 40, 40, . . . and a total basic adjustable amount of energy calculated by a basic adjustable amount calculation unit 36f to be described later are stored in the basic adjustable amount memory area 35e.

(2-2-5-6) Distributed Amount Memory Area

A distributed amount of energy distributed to each air conditioner 40, 40, . . . by a distribution unit 36h to be described later is stored in the distributed amount memory area 35f.

(2-2-5-7) Suppression Request Memory Area

A suppression request time and a requested suppressed amount of energy received from the energy management device 10 by a receiving unit 36e to be described later are stored in the suppression request memory area 35g.

(2-2-6) Control Unit

The control unit 36 is configured with a CPU, a ROM, a RAM, and the like. The control unit 36 mainly functions as an operating status grasping unit 36a, a meter value acquisition unit 36b, a reference adjustable amount calculation unit 36c, a presentation unit 36d, a receiving unit 36e, a basic adjustable amount calculation unit 36f, a difference amount calculation unit 36g, a distribution unit 36h, and a control instruction generation unit 36i, by reading and executing programs stored in the abovementioned storage unit 35.

(2-2-6-1) Operating Status Grasping Unit

The operating status grasping unit 36a grasps the operating status of each air conditioner 40, 40, . . . in a prescribed time interval (five-minute interval in the present embodiment) on being presented with the time from the time management unit 34. The operating status is stored in the operating status memory area 35a.

(2-2-6-2) Meter Value Acquisition Unit

The meter value acquisition unit 36b acquires a power, amount of power, or other meter values of each air conditioner 40, 40, . . . metered by the power meter 7, in a prescribed time interval (one-minute interval in the present embodiment) using the presented time from the time management unit 34. The meter values are stored in the meter value memory area 35c.

(2-2-6-3) Reference Adjustable Amount Calculation Unit

The reference adjustable amount calculation unit 36c calculates an adjustable amount of energy in a first operating status for each air conditioner 40, 40, . . . (referred to as "individual adjustable amount"), and further calculates a sum thereof as a reference adjustable amount of energy. Calculation of the reference adjustable amount of energy by the reference adjustable amount calculation unit 36c is executed each hour using the presented with the time from the time management unit 34. "First operating status" here is the operating status of the air conditioners 40, 40, . . . at the time of executing the calculation. The individual reference adjustable amount is calculated by subtracting a second individual reference power from a first individual reference power to be described later. The individual reference adjustable amount is a value calculated using conditions stored in the condition memory area 35b, and in the present embodiment, a plurality of individual reference adjustable amounts are calculated corresponding to maintainable times in the conditions. As a result, a plurality of reference adjustable amounts of energy calculated as a sum of the individual reference adjustable amounts are also calculated in corresponding to maintainable times in the conditions stored in the condition memory area 35b.

In the present embodiment, if air conditioners 40, 40, . . . stop their operation or execute a defrosting operation or an oil return operation at the time of calculation of the reference adjustable amount of energy, these air conditioner are excluded from the calculation objects of the reference adjustable amount of energy. Here, "oil return operation" is an operation in which refrigerant oil accumulated in the refrigerant piping connecting the outdoor unit 41, 41, . . . and the indoor unit 42, 42, . . . , and the like, is returned to the compressor housed in the outdoor unit 41, 41, . . . . "Oil return operation" is normally an operation performed in about five to ten minutes. "Defrosting operation" is an operation performed in order to prevent adherence of frost on an outdoor heat exchanger (not illustrated) housed in the outdoor unit 41, 41, . . . . "Defrosting operation" is an operation performed in about five to ten minutes.

The first individual reference power is calculated by the reference adjustable amount calculation unit 36c on the basis of the present operating status of each air conditioner 40, 40, . . . grasped by the operating status grasping unit 36a and the meter value of each air conditioner 40, 40, . . . stored in the meter value memory area 35c. Specifically, if a certain air conditioner 40 is presently in normal operation (not including a defrosting operation or oil return operation), an average of the power over the most recent 30 minutes of the air conditioner 40 stored in the meter value memory area 35c is calculated as the first individual reference power.

However, the method of calculation of the first individual reference power is not limited to this. For example, the first individual reference power may be a median value of the power over the most recent 30 minutes of the air conditioner 40 stored in the meter value memory area 35c. Also, for example, the first individual reference power may be obtained by correcting the average of the power over the most recent 30 minutes of the air conditioner 40 stored in the meter value memory area 35c in accordance with a degree of deviation between a set temperature and an indoor temperature and/or a degree of deviation between an outdoor temperature and an indoor temperature related to the air conditioner 40 stored in the operating status memory area 35a. The first individual reference power also may be a most recent power of the air conditioner 40 stored in the meter value memory area 35c.

The second individual reference power is calculated using the present operating status of each air conditioner 40, 40, . . . grasped by the operating status grasping unit 36a and the conditions stored in the condition memory area 35b. This is described with a specific example.

Assume that the operating capacity of an operating air conditioner 40 grasped by the operating status grasping unit 36a at the time of calculation of the individual reference adjustable amount is 100% and the rated power of this air conditioner 40 is 100 kW. Assume that the conditions in FIGS. 4(a) and (b) are stored in the condition memory area 35b as conditions for this air conditioner 40.

The conditions in FIG. 4(a) between FIGS. 4(a) and (b) are used because the operating capacity of the air conditioner 40 is 100%. The conditions in FIG. 4(a) signify that for this air conditioner 40, the operating capacity can be set to 40% if the time for adjustment of power is 15 minutes, the operating capacity can be set to 60% if the time for adjustment of power is 30 minutes, and the operating capacity can be set to 80% if the time for adjustment of power is 60 minutes. Because the rated power of this air conditioner 40 is 100 kW, this signifies that the power can be suppressed to 40 kW if the time for adjustment of power is 15 minutes, the power can be suppressed to 60 kW if the time for adjustment of power is 30 minutes, and the power can be adjusted to 80 kW if the time for adjustment of power is 60 minutes. These three values 40 kW, 60 kW, and 80 kW are the second individual reference power corresponding to the maintainable times 15 minutes, 30 minutes, and 60 minutes.

The calculated reference adjustable amounts of energy and the maintainable times being a condition in the calculation are stored in the reference adjustable amount memory area 35d.

(2-2-6-4) Presentation Unit

The presentation unit 36d transmits via the communication unit 31 and presents to the energy management device 10 a plurality of combinations of the maintainable times and the reference adjustable amounts of energy stored in the reference adjustable amount memory area 35d. The presentation unit 36d presents to the energy management device 10 the combinations of the maintainable times and the reference adjustable amounts of energy at a timing in which the reference adjustable amounts of energy are calculated by the reference adjustable amount calculation unit 36c.

(2-2-6-5) Receiving Unit

The receiving unit 36e receives various kinds of information transmitted from the energy management device 10. The receiving unit 36e specifically receives an energy suppression request including a suppression request time and a requested suppressed amount of energy.

(2-2-6-6) Basic Adjustable Amount Calculation Unit

The basic adjustable amount calculation unit 36f calculates an adjustable power as a basic adjustable amount of energy for each air conditioner 40, 40, . . . using the present operating status of each air conditioner 40, 40, . . . grasped by the operating status grasping unit 36a at the time when the energy suppression request is received by the receiving unit 36e. A sum of the basic adjustable amounts of energy furthermore is calculated as a total basic adjustable amount. The basic adjustable amount of energy is calculated by subtracting a second individual basic power from a first individual basic power to be described later. The basic adjustable amount of energy is calculated independently of the requested suppressed amount of energy.

In the present embodiment, equipment maintenance takes priority, and therefore when air conditioners 40, 40, . . . execute a defrosting operation or an oil return operation, these air conditioners are excluded from the object of energy adjustment control and are excluded from the object of the calculation for the basic adjustable amount of energy. The same applies to air conditioners 40, 40, . . . that stop their operation.

The first individual basic power is calculated using the same method with which the first individual reference power is calculated by the reference adjustable amount calculation unit 36c as previously described. The explanation of the method is omitted here.

The second individual basic power is calculated using the present operating status of each air conditioner 40, 40, . . . grasped by the operating status grasping unit 36a, the suppression request time received by the receiving unit 36e, and the conditions stored in the condition memory area 35b. This is described with a specific example.

Assume that the operating capacity of an air conditioner 40 grasped by the operating status grasping unit 36a at the time of the energy suppression request is 80% and the rated power of this air conditioner 40 is 100 kW. Assume that the suppression request time received by the receiving unit 36e is 30 minutes, and the conditions in FIGS. 4(a) and (b) are stored in the condition memory area 35b as conditions of air conditioners 40 for calculating the second individual basic power.

The conditions in FIG. 4(b) between FIGS. 4(a) and (b) are used because the operating capacity of the air conditioner 40 is 80%. The conditions in FIG. 4(b) signify that for this air conditioner 40, the operating capacity can be set to 20% if the time for adjustment of power is 15 minutes, the operating capacity can be set to 40% if the time for adjustment of power is 30 minutes, and the operating capacity can be set to 60% if the time for adjustment of power is 60 minutes. Because the rated power of this air conditioner 40 is 100 kW, this signifies that the power can be adjusted to 20 kW if the time for adjustment of power is 15 minutes, the power can be adjusted to 40 kW if the time for adjustment of power is 30 minutes, and the power can be adjusted to 60 kW if the time for adjustment of power is 60 minutes. Here, because the suppression request time received by the receiving unit 36e is 30 minutes, the corresponding condition for a maintainable time of 30 minutes is used, and the second individual basic power is calculated as 40 kW.

The calculated basic adjustable amounts of energy and the total basic adjustable amount of energy are stored in the basic adjustable amount memory area 35e.

(2-2-6-7) Difference Amount Calculation Unit

The difference amount calculation unit 36g calculates an energy difference amount by subtracting the total basic adjustable amount stored in the basic adjustable amount memory area 35e from the requested suppressed amount of energy stored in the suppression request memory area 35g. The energy difference amount is normally not zero because the total basic adjustable amount and the basic adjustable amount of energy being a basis for the calculation of the total basic adjustable amount are calculated independently of the requested suppressed amount of energy. The energy difference amount is not limited to a positive value and may also be a negative value.

(2-2-6-8) Distribution Unit

The distribution unit 36h distributes to a plurality of air conditioners 40, 40, . . . the energy difference amount calculated by the difference amount calculation unit 36g. Specifically, the distribution unit 36h distributes the energy difference amount equally among a plurality of air conditioners 40, 40, . . . (excluding air conditioners 40, 40, . . . that are stopping their operation and that are executing a defrosting operation or an oil return operation). In other words, the distribution unit 36h distributes to the air conditioners 40, 40, . . . in normal operation an amount of energy obtained by dividing the energy difference amount by the number of units of air conditioners 40, 40, . . . in normal operation as a distributed amount of energy. The distributed amount of energy is stored in the distributed amount memory area 35*f* for each air conditioner 40, 40, . . . .

The distribution unit 36*h* may distribute the energy difference amount proportionally to the rated power of the air conditioners 40, 40, . . . or proportionally to the power presently used by the air conditioners 40, 40, . . . , rather than distributing the energy difference amount by the number of units as mentioned above. The distribution unit 36*h* may also distribute the energy difference amount to the air conditioners 40, 40, . . . proportionally to the basic adjustable amount of energy of each air conditioner 40, 40, . . . calculated by the basic adjustable amount calculation unit 36*f*.

The distribution unit 36*h* also may be configured not to distribute when an absolute value of the energy difference amount is smaller than a prescribed value (for example, 5 kW). The distribution unit 36*h* may be configured not to distribute particularly when the absolute value of the energy difference amount is smaller than the prescribed value and the energy difference amount is negative.

(2-2-6-9) Control Instruction Generation Unit

The control instruction generation unit 36*i* instructs the air conditioners 40, 40, . . . to perform adjustment control of power so that a total of power suppressed at the property A becomes equal to the requested suppressed amount of energy stored in the suppression request memory area 35*g*, on the basis of the basic adjustable amount of energy stored in the basic adjustable amount memory area 35*e* and the distributed amount of energy stored in the distributed amount memory area 35*f*.

Specifically, the control instruction generation unit 36*i* calculates as an execution adjusted amount of energy a sum of the basic adjustable amount of energy and the distributed amount of energy for each air conditioner 40, 40, . . . on the basis of the information stored in the basic adjustable amount memory area 35*e* and the distributed amount memory area 35*f*. The control instruction generation unit 36*i* then generates an adjustment control instruction for the air conditioners 40, 40, . . . to adjust the power by the respective execution adjusted amount of energy. An "adjustment control instruction" is an instruction instructing, for example, to change a set temperatures of the indoor units 42, 42, . . . of the air conditioners 40, 40, . . . , or to control the rotation number of the compressors of the outdoor units 41, 41, . . . . The control instruction generation unit 36*i* furthermore transmits the adjustment control instruction to each air conditioner 40, 40, . . . and instructs the execution thereof.

(3) Control Processing Performed in the Energy Management System 100

Figure 5:
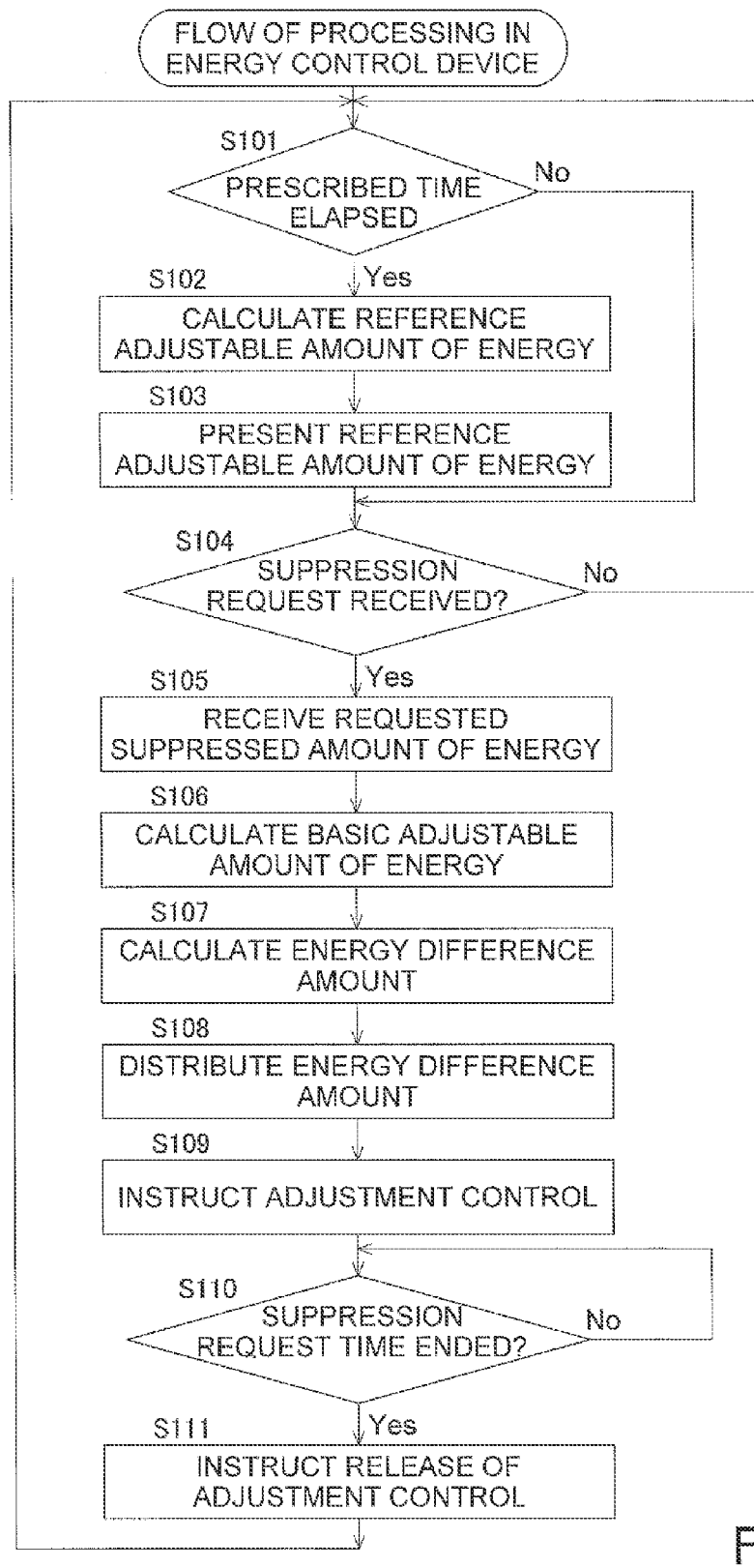
FIG. 5 is a flow chart illustrating the flow of processing in the energy control device according to the first embodiment of the present invention.

The flow of processing of energy adjustment control in the energy control device 30 is described below using FIG. 5.

First in step S101, the time management unit 34 determines whether a prescribed time, specifically, one hour, has elapsed since the reference adjustable amount calculation unit 36*c* previously calculated the reference adjustable amount of energy. The flow advances to step S102 when the prescribed time has elapsed, and the flow advances to step S104 when the prescribed time has not elapsed.

In step S102, the reference adjustable amount calculation unit 36*c* calculates a reference adjustable amount of energy. Specifically, the reference adjustable amount calculation unit 36*c* calculates an individual reference adjustable amount for each air conditioner 40, 40, . . . on the basis of a present operating status of each air conditioner 40, 40, . . . grasped by the operating status grasping unit 36*a*, a meter value of each air conditioner 40, 40, . . . stored in the meter value memory area 35*c*, and conditions stored in the condition memory area 35*b*. The reference adjustable amount calculation unit 36*c* furthermore adds up the individual reference adjustable amounts for all of the air conditioners 40, 40, . . . and calculates the result as a reference adjustable amount of energy. The calculated reference adjustable amount of energy and a maintainable time, being a condition in the calculation, are stored in combination in the reference adjustable amount memory area 35*d*.

In step S103, the presentation unit 36*d* presents to the energy management device 10 the combinations of the maintainable times and the reference adjustable amounts of energy stored in the reference adjustable amount memory area 35*d*.

In step S104, it is determined whether an energy suppression request from the energy management device 10 was received by the receiving unit 36*e*. The flow moves to step S105 when it is determined to be received. Meanwhile, the flow returns to step S101 when it is determined not to be received.

In step S105, the suppression request time and the requested suppressed amount of energy received by the receiving unit 36*e* are stored in the suppression request memory area 35*g*.

In step S106, a basic adjustable amount of energy is calculated. Specifically, the basic adjustable amount calculation unit 36*f* calculates a basic adjustable amount of energy for each air conditioner 40, 40, . . . on the basis of the present operating status of each air conditioner 40, 40, . . . grasped by the operating status grasping unit 36*a*, the meter value of each air conditioner 40, 40, . . . stored in the meter value memory area 35*c*, the suppression request time stored in the suppression request memory area 35*g*, and the conditions stored in the condition memory area 35*b*. The basic adjustable amount calculation unit 36*f* furthermore adds up the basic adjustable amounts of energy for all of the air conditioners 40, 40, . . . and calculates the added-up value as a total basic adjustable amount. The calculated basic adjustable amounts of energy and the total basic adjustable amount are stored in the basic adjustable amount memory area 35*e*.

In step S107, the difference amount calculation unit 36*g* calculates an energy difference amount by subtracting the total basic adjustable amount stored in the basic adjustable amount memory area 35*e* from the requested suppressed amount of energy stored in the suppression request memory area 35*g*.

In step S108, the distribution unit 36*h* distributes the energy difference amount calculated by the difference amount calculation unit 36*g* equally to the air conditioners 40, 40, . . . in normal operation, and calculates a distributed amount of energy for each air conditioner 40, 40, . . . . The distributed amount of energy for each air conditioner 40, 40, . . . is stored in the distributed amount memory area 35*f*.

In step S109, the control instruction generation unit 36*i* adds the basic adjustable amount of energy stored in the basic adjustable amount memory area 35*e* and the distributed amount of energy stored in the distributed amount memory area 35*f* for each air conditioner 40, 40, . . . , and calculates the result as an execution adjusted amount of energy. The control instruction generation unit 36*i* furthermore generates an adjustment control instruction for adjusting the power by the execution adjusted amount of energy calculated for each air conditioner 40, 40, . . . . The control instruction generation unit then transmits the adjustment control instruction to each air conditioner 40, 40, . . . and instructs execution of energy adjustment control.

In step S110, the time management unit 34 determines whether the suppression request time has elapsed since the control instruction generation unit 36i transmitted the adjustment control instruction. If it is determined that the suppression request time has ended, in step S111 an instruction to release adjustment control is transmitted to each air conditioner 40, 40, . . . from the control instruction generation unit 36i, and the control flow then returns to step S101. Step S110 is iterated until it is determined that the suppression request time has ended.

(4) Features 4-1

In the present embodiment, an energy control device 30 adjusts an amount of energy of air conditioners 40, 40, . . . , being a plurality of pieces of equipment placed at a property A and comprises a receiving unit 36e, a basic adjustable amount calculation unit 36f, and a control instruction generation unit 36i. The receiving unit 36e receives an energy suppression request including information related to a requested suppressed amount of energy that is an amount of energy to be suppressed at the property A. The basic adjustable amount calculation unit 36f calculates, upon receipt of the energy suppression request, a basic adjustable amount of energy for each air conditioner 40, 40, . . . independently of the requested suppressed amount of energy on the basis of an operating status of the air conditioner 40, 40, . . . at the time when the energy suppression request is received. The control instruction generation unit 36i instructs the air conditioners 40, 40, . . . to perform the energy amount adjustment control so that a total of suppressed amounts of energy at the property A becomes equal to the requested suppressed amount of energy on the basis of the basic adjustable amount of energy for each air conditioner 40, 40, . . . .

Here, the basic adjustable amount of energy for each air conditioner 40, 40, . . . based on the operating status of the air conditioner 40, 40, . . . at the time of receiving the energy suppression request is calculated independently of the requested suppressed amount of energy upon receipt of the energy suppression request, and energy adjustment of each air conditioner 40, 40, . . . is performed on the basis of the basic adjustable amount of energy. Because the basic adjustable amount of energy is a value that is calculated as adjustable upon considering the operating status of the air conditioners 40, 40, . . . at the time of receiving the energy suppression request, the air conditioners 40, 40, . . . can suppress power by the requested suppressed amount of energy quickly. Because the conditions used for calculating the basic adjustable amount of energy are values that are predetermined so that an influence on the environment of the user is brought to within an allowed range, user comfort also is unlikely to be impaired when suppression control is executed using these conditions.

4-2

In the present embodiment, the energy control device 30 further comprises a difference amount calculation unit 36g and a distribution unit 36h. The difference amount calculation unit 36g calculates as an energy difference amount a difference between a total of the basic adjustable amounts of energy for each air conditioner 40, 40, . . . and the requested suppressed amount of energy. The distribution unit 36h distributes the energy difference amount to the air conditioners 40, 40, . . . . The control instruction generation unit 36i instructs the air conditioners 40, 40, . . . to perform the energy amount adjustment control on the basis of the basic adjustable amount of energy for each air conditioner 40, 40, . . . and a result of the distribution of the energy difference amount performed by the distribution unit 36h.

Here, the requested suppressed amounts of energy are not directly distributed to the air conditioners 40, 40, . . . , but the difference between the total of the basic adjustable amounts of energy and the requested suppressed amount of energy is calculated as an energy difference amount, and the calculated energy difference amount is distributed to the air conditioners 40, 40, . . . . Accordingly, the amount of energy distributed to each air conditioner 40, 40, . . . easily becomes a smaller value compared to when the requested suppressed amount of energy is directly distributed. As a result, it is possible to respond with good precision to the requested suppressed amount of energy immediately after receiving the energy suppression request.

4-3

In the present embodiment, the receiving unit 36e receives the energy suppression request from an energy management device 10 of a power company 1. The energy control device 30 further comprises a reference adjustable amount calculation unit 36c and a presentation unit 36d. The reference adjustable amount calculation unit 36c calculates as a reference adjustable amount of energy a total of adjustable amounts of energy of the air conditioners 40, 40, . . . in a first operating status. The presentation unit 36d presents the reference adjustable amount of energy to the energy management device 10 prior to the energy suppression request. In the present embodiment, "first operating status" indicates an operating status at the time of calculation of the reference adjustable amount of energy.

Here, because the reference adjustable amount of energy is presented to the energy management device 10 prior to the energy suppression request, a feasible energy suppression request is easily presented to the energy control device 30 from the energy management device 10. As a result, the air conditioners 40, 40, . . . can more easily adjust the power so that the requested suppressed amount of energy as a whole is suppressed immediately. Suppression of the amount of energy also can be executed within an extent in which user comfort is not impaired.

Furthermore in the present embodiment, the requested suppressed amount of energy is less than or equal to the reference adjustable amount of energy. Adjustment of the amount of energy is thereby more easily executed in response to the requested suppressed amount of energy, and user comfort also is unlikely to be impaired.

(5) Modified Examples

An embodiment of the present invention is described above using the drawings, but the specific configuration is not limited to the abovementioned embodiment, and modifications are possible within a scope not deviating from the gist of the invention.

Modified examples of the present invention are illustrated below. A plurality of modified examples may be suitably combined.

(5-1) Modified Example 1A

In the abovementioned embodiment, the distribution unit 36h distributes the energy difference amount to the air conditioners 40, 40, . . . in normal operation in equal parts, or proportionally to a rated power, a used power at the time of calculation of the basic adjustable amount of energy, the calculated basic adjustable amount of energy, or the like, but there is no limitation to this. For example, the distribution unit 36h may distribute the energy difference amount to the air conditioners 40, 40, . . . in normal operation on the basis of information of user comfort/discomfort associated with the air conditioners 40, 40, . . . . The air conditioners 40, 40, . . . also may distribute the energy difference amount not to the air conditioners 40, 40, . . . as a whole rather to the indoor units 42, 42, . . . or the outdoor units 41, 41, . . . .

This is described below on the basis of FIGS. 6 to 9.

Figure 6:
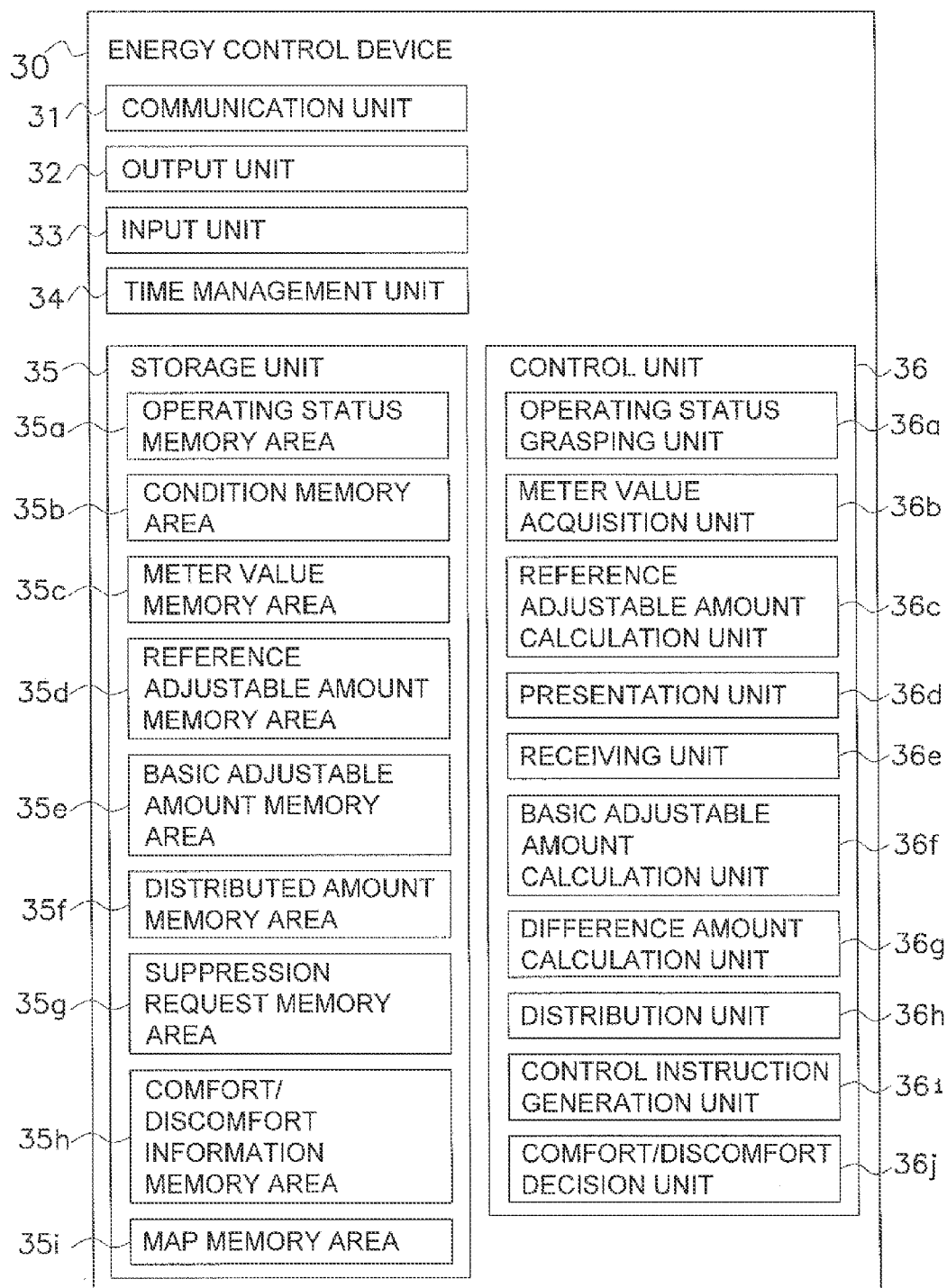
FIG. 6 is a general configuration diagram of the energy control device according to modified example 1A.

The storage unit 35 further has a comfort/discomfort information memory area 35h for storing information regarding user comfort/discomfort for each air conditioner 40, 40, . . . , and a map memory area 35i for storing various kinds of maps, as illustrated in FIG. 6. The information regarding user comfort/discomfort may be information that is directly input via an input unit 33 by the user when the user feels uncomfortable and is stored in the comfort/discomfort information memory area 35h, or may be information that is decided on the basis of a set temperature or a degree of deviation between a set temperature and an indoor temperature, and/or the like. A specific example is described here concerning the latter case.

When the user comfort/discomfort is decided on the basis of a set temperature or a degree of deviation between a set temperature and an indoor temperature, and/or the like, the control unit 36 of the energy control device 30 further functions as a comfort/discomfort decision unit 36j for deciding on user comfort/discomfort, as illustrated in FIG. 6.

For example, the comfort/discomfort decision unit 36j may decide on user comfort/discomfort for each indoor unit 42, 42, . . . , and, based on that, the distribution unit 36h may distribute an energy difference amount to the indoor units 42, 42, . . . in normal operation.

The processing of decision of user comfort/discomfort for each indoor unit 42, 42, . . . by the comfort/discomfort decision unit 36j and the process of distribution of the energy difference amount performed by the distribution unit 36h are described below.

Here, a first map for deciding on user comfort/discomfort for each indoor unit 42, 42, . . . , for example as in FIG. 7, is stored in the map memory area 35i. "Degree of degradation" in FIG. 7 signifies a degree of deviation between a set temperature and an indoor temperature. "Rank" in FIG. 7 signifies a rank of user comfort/discomfort.

The comfort/discomfort decision unit 36j refers to the first map stored in the map memory area 35i, and decides on the rank of user comfort/discomfort for each indoor unit 42, 42, . . . from the degree of degradation of the indoor units 42, 42, . . . . For example, in the first map in FIG. 7, the rank of user comfort/discomfort associated with a certain indoor unit 42 is 2 when the degree of degradation of that indoor unit 42 is 1.5.

The distribution unit 36h distributes the energy difference amount to the indoor units 42, 42, . . . in normal operation in accordance with the user comfort/discomfort rank for each indoor unit 42, 42, . . . determined by the comfort/discomfort decision unit 36j. The energy difference amount is distributed so that power is more suppressed by the indoor units 42, 42, . . . having a small number of rank of comfort/discomfort, that is, being determined as such that the users are comfortable. Meanwhile, the energy difference amount is distributed so that power is less suppressed by the indoor units 42, 42, . . . having a large number of rank of comfort/discomfort, that is, being determined as such that the users are uncomfortable.

Also, for example, the comfort/discomfort decision unit 36j may decide on the user comfort/discomfort for each outdoor unit 41, 41, . . . , and, based on that, the distribution unit 36h may distribute an energy difference amount to the air conditioners 40, 40, . . . in normal operation.

More specifically, a second map, for example as in FIG. 8, for deciding on user comfort/discomfort for each outdoor unit 41, 41, . . . is stored in addition to the aforementioned first map in the map memory area 35i.

The comfort/discomfort decision unit 36j refers to the first and second maps stored in the map memory area 35i, and decides on the rank of user comfort/discomfort for each outdoor unit 41, 41, . . . from the rank of user comfort/discomfort associated with the indoor unit 42, 42, . . . (specifically, the occurrence rate of indoor units 42, 42, . . . having 3 or larger number of rank of user comfort/discomfort within the same system). That is, the rank of user comfort/discomfort associated with the outdoor unit 41, 41, . . . is decided on the basis of the degree of degradation of the indoor unit 42, 42, . . . . For example, if three of five indoor units 42, 42, . . . within the same system has 3 or larger number of rank of user comfort/discomfort, the rank of comfort/discomfort of the outdoor units 41 is 4 because 3/5×100(%)=60(%).

The distribution unit 36h distributes the energy difference amount to the outdoor units 41, 41, . . . in normal operation in accordance with the rank of user comfort/discomfort for each outdoor unit 41, 41, . . . determined by the comfort/discomfort decision unit 36j. The energy difference amount is distributed so that power is more suppressed by the outdoor units 41, 41, . . . having a small number of rank of comfort/discomfort, that is, being determined as such that the users are comfortable. Meanwhile, the energy difference amount is distributed so that power is less suppressed by the outdoor units 41, 41, . . . having a large number of rank of comfort/discomfort, that is, being determined as such that the users are uncomfortable.

In the present modified example, because the energy difference amount is distributed on the basis of user comfort/discomfort, it is possible to respond to the energy suppression request without impairing user comfort.

(5-2) Modified Example 1B

In the abovementioned modified example 1A, the comfort/discomfort information memory area 35h and the map memory area 35i are described as elements of the storage unit 35, but user comfort/discomfort may also be determined by a method as follows, and, based on that, the energy difference amount may be distributed by the distribution unit 36h.

For example, an air-conditioned space in which air conditioners 40, 40, . . . are installed may be virtually partitioned into a plurality of partitions, partitions having high necessity and partitions having low necessity of air conditioning by the air conditioners 40, 40, . . . may be stored in advance in a storage unit 35, and the energy difference amount may be distributed on the basis of that standard. That is, the distribution unit 36h distributes the energy difference amount so that the power is not suppressed so much in the partitions having high necessity of air conditioning and the power is suppressed to the extent possible in the partitions having low necessity of air conditioning. In this case, the storage unit 35 has a plan view data memory area (not illustrated) for storing plan view data rendering the air-conditioned space in which the air conditioners 40, 40, ... are placed and the plurality of partitions in two dimensions. A plurality of partitions is established, for example by an operator, or the like.

Instead of partitioning the air-conditioned space as mentioned above, air conditioners 40, 40, ... having high operating rate and air conditioners 40, 40, ... having low operating rate may also be stored in advance in the storage unit 35 and the energy difference amount may be distributed using this.

A future operating state (operating time, or the like) of the air conditioners 40, 40, ... may also be predicted on the basis of the operating status of the air conditioners 40, 40, ..., and the energy difference amount may be distributed on the basis of the future operating state.

In the present modified example, it is easy to respond to the energy suppression request without impairing user comfort.

(5-3) Modified Example 1C

In the abovementioned embodiment, only one basic adjustable amount of energy is calculated for each air conditioner 40, 40, ..., but there is no limitation to this, and a plurality of basic adjustable amounts of energy may be calculated for each air conditioner 40, 40, ....

Specifically, conditions corresponding to an intensity of energy suppression control may be stored in addition to a maintainable time as illustrated in FIG. 9 in the condition memory area 35b, and the basic adjustable amounts of energy may be calculated on the basis of these conditions.

In this case, only the conditions of "moderate" intensity of energy suppression control in FIG. 9 are used when the reference adjustable amount calculation unit 36c calculates the reference adjustable amount of energy using the conditions stored in the condition memory area 35b. Meanwhile, basic adjustable amounts of energy are calculated for all of "low," "moderate," and "high" intensities of energy suppression control when the basic adjustable amount calculation unit 36f calculates the basic adjustable amounts of energy using the conditions stored in the condition memory area 35b. The basic adjustable amount calculation unit 36f also calculates a total basic adjustable amount for each of the "low," "moderate," and "high" intensities of energy suppression control. A plurality of differences between the total basic adjustable amount and the requested suppressed amount of energy are calculated as energy difference amounts by the difference amount calculation unit 36g. The distribution unit 36h distributes to the air conditioners 40, 40, ... in normal operation a smallest energy difference amount by which a difference between the total basic adjustable amount and the requested suppressed amount of energy becomes smallest. The control instruction generation unit 36i adds the basic adjustable amount of energy for each air conditioner 40, 40, ... which is used when the smallest energy difference amount is calculated and the distributed amount of energy for each air conditioner 40, 40, ... distributed by the distribution unit 36h, and calculates an execution adjusted amount of energy for each air conditioner 40, 40, .... The control instruction generation unit 36i furthermore generates an adjustment control instruction for each air conditioner 40, 40, ... to adjust the execution adjusted amount of energy, transmits the adjustment control instruction to each air conditioner 40, 40, ..., and instructs execution thereof.

In the present modified example, by taking as a condition of "moderate" intensity of energy suppression control an optimal allowed suppression intensity that is believed not to impair user comfort and is believed also to allow sufficient suppression of the amount of energy, energy adjustment is easily executed without impairing user comfort upon a receipt of an energy suppression request. Meanwhile, because a plurality of total basic adjustable amounts are calculated and the distribution unit 36h distributes the energy difference amount in which the difference between the total basic adjustable amount and the requested suppressed amount of energy is the smallest, energy adjustment control corresponding to the requested suppressed amount of energy is easily executed immediately after the request for suppression control.

(5-4) Modified Example 1D

When the control unit 36 functions as a comfort/discomfort decision unit 36j for deciding user comfort/discomfort for each outdoor unit 41, 41, ... and/or indoor unit 42, 42, ... as described in modified example 1A, the basic adjustable amount calculation unit 36f may exclude outdoor units 41, 41, ... and/or indoor units 42, 42, ... having a large number of rank of user comfort/discomfort from being object of the calculation of the basic adjustable amount of energy. The control instruction generation unit 36i furthermore may exclude outdoor units 41, 41, ... and/or indoor units 42, 42, ... having a large number of rank of user comfort/discomfort from being object of energy adjustment.

Here, it becomes easy to respond to the energy suppression request without impairing user comfort.

(5-5) Modified Example 1E

When the control unit 36 functions as a comfort/discomfort decision unit 36j for deciding user comfort/discomfort for each outdoor unit 41, 41, ... and/or indoor unit 42, 42, ... as described in modified example 1A, the distribution unit 36h may distribute power so that the power used by the outdoor units 41, 41, ... and/or indoor units 42, 42, ... having a large number of rank of user comfort/discomfort becomes greater than when receiving an energy suppression request.

Here, the user comfort is improved because the use of power increases for the outdoor units 41, 41, ... and/or indoor units 42, 42, ... being determined as such that the users are uncomfortable. Meanwhile, it is possible to respond to the energy suppression request as the entirety of the property A because an increased portion of power is distributed to the outdoor units 41, 41, ... and/or indoor units 42, 42, ... being determined as such that the users are comfortable.

(5-6) Modified Example 1F

In addition to the abovementioned embodiment, the receiving unit 36e of the energy control device 30 may further receive unit cost information of an amount of energy. "Unit cost information" here is information indicating unit cost of an amount of power for each time period. The unit cost information of the amount of energy may be transmitted from the energy management device 10 or may be transmitted from equipment other than the energy management device 10.

In the abovementioned embodiment, the reference adjustable amount of energy is calculated and is presented to the energy management device 10 in a fixed time interval, but the time interval is not necessarily fixed.

In the present modified example, the energy control device 30 has a unit cost information grasping unit (not illustrated) for grasping a time period in which the unit cost of the amount of power exceeds a prescribed value (a given value stored in advance in the storage unit 35). The reference adjustable amount calculation unit 36c calculates the reference adjustable amount of energy and the presentation unit 36d presents the calculated reference adjustable amount of energy to the energy management device 10 only in the time period in which the unit cost of the amount of energy exceeds the prescribed value.

Here, a time period in which the unit cost of the amount of energy is expensive and/or a time period in which the unit cost of the amount of energy exceeds a prescribed value can be grasped by receiving the unit information of the amount of energy with the energy control device 30. By presenting that time period and the suppressible amount of energy in that time period to the energy management device 10, it can be arranged so that energy adjustment control is performed in a time period in which the unit cost of the amount of energy exceeds a prescribed value. Control corresponding to the intention of the power company 1 expecting to suppress the amount of energy during peak demand for power thereby becomes easier and a benefit such as reduction of the energy cost also is provided to the user.

(5-7) Modified Example 1G

The control subject in the abovementioned embodiment is air conditioners 40, 40, . . . , but there is no limitation to this. For example, lighting, water heaters, ventilating fans, and/or other equipment may also be control subjects. In other words, the equipment may include air conditioners 40, 40, . . . and other facility equipment. In this case, a meter for metering the amount of energy for the lighting, water heaters, ventilating fans, and/or other equipment and other equipment for controlling the energy management system 100 may be required. Also in this case, ON/OFF, brightness level, and the like, are included in the operating state and operating status of the lighting; ON/OFF, hot water temperature, the hot water supply quantity, and the like, are included in the operating state and operating status of water heaters; and rotation number and/or wind volume of the ventilating fans are included in the operating state and operating status of the ventilating fans. Various kinds of temperature, pressure, and/or the like, included in various kinds of operating status are detected with various kinds of sensors, and the like.

In this case, there is no need for the conditions stored in the condition memory area 35b using a maintainable time as a variable as in FIG. 4. For example, a condition for lighting may be a lighting rate of the lighting decided in accordance with a level of illuminance sensed by an illuminance sensor not illustrated. Also, for example, a condition for a ventilating fan may be used for changing the wind volume of the ventilating fans in accordance with a level of indoor carbon dioxide concentration sensed by a CO2 sensor not illustrated and adjusting the amount of energy. "Lighting rate" of lighting signifies rate of lighting which is lit among the lighting placed in a space to be measured by the illuminance sensor.

(5-8) Modified Example 1H

In the abovementioned embodiment, the presentation unit 36d presents the reference adjustable amount of energy to the energy management device 10, and the receiving unit 36e of the energy control device 30 receives the requested suppressed amount of energy, but there is no limitation to this.

Figure 10:
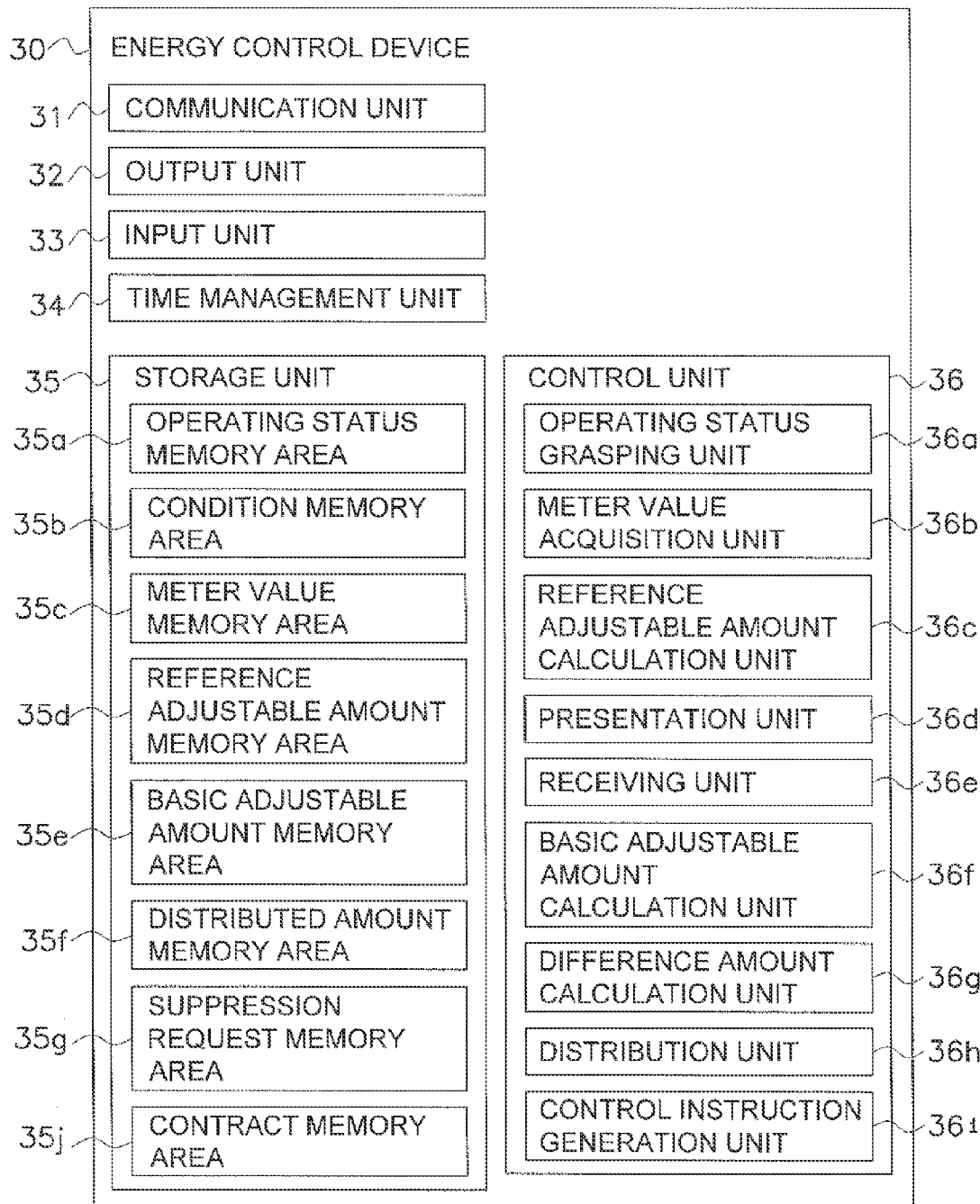
FIG. 10 is a general configuration diagram of the energy control device according to modified example 1H.

For example, the requested suppressed amount of energy may be decided by contract in advance between the power company 1 and the property A. In this case, the requested suppressed amount of energy may be stored in a contract memory area 35j provided in the storage unit 35 as in FIG. 10. Information related to the requested suppressed amount of energy received from the energy management device 10 by the receiving unit 36e of the energy control device 30 calls the requested suppressed amount of energy from the contract memory area 35j.

The requested suppressed amount of energy also may be transmitted unilaterally to the energy control device 30 by the energy management device 10 without prior negotiation. In this case, the energy reference adjustable amount calculation unit 36c and the presentation unit 36d may be absent.

(5-9) Modified Example 1I

In the abovementioned embodiment, the presentation unit 36d presents the reference adjustable amount of energy unilaterally to the energy management device 10, but there is no limitation to this.

For example, the energy management device 10 may request to the properties A and B to present the reference adjustable amount of energy, and the energy control device 30 may present the reference adjustable amount of energy to the energy management device 10 in response to this request.

(5-10) Modified Example 1J

In the abovementioned embodiment, the receiving unit 36e receives as a suppression control time one time selected from a plurality of maintainable times by the energy management device 10, but there is no limitation to this. For example, the receiving unit 36e may receive a suppression control time independently decided by the energy management device 10. The basic adjustable amount calculation unit 36f may calculate the basic adjustable amount of energy using a condition of the maintainable time closest to the received suppression control time.

(5-11) Modified Example 1K

In the abovementioned embodiment, the reference adjustable amount calculation unit 36c calculates the reference adjustable amount of energy on the basis of the operating status of the air conditioners 40, 40, . . . at the time of calculation of the reference adjustable amount of energy, but there is no limitation to this. For example, the reference adjustable amount calculation unit 36c may predict a future operating status of the air conditioners 40, 40, . . . from a past operating status and energy use status stored in the operating status memory area 35a and the meter value memory area 35c, and may calculate the reference adjustable amount of energy on the basis of the predicted operating status of the air conditioners 40, 40, . . . at a future time.

(5-12) Modified Example 1L

Figure 11:
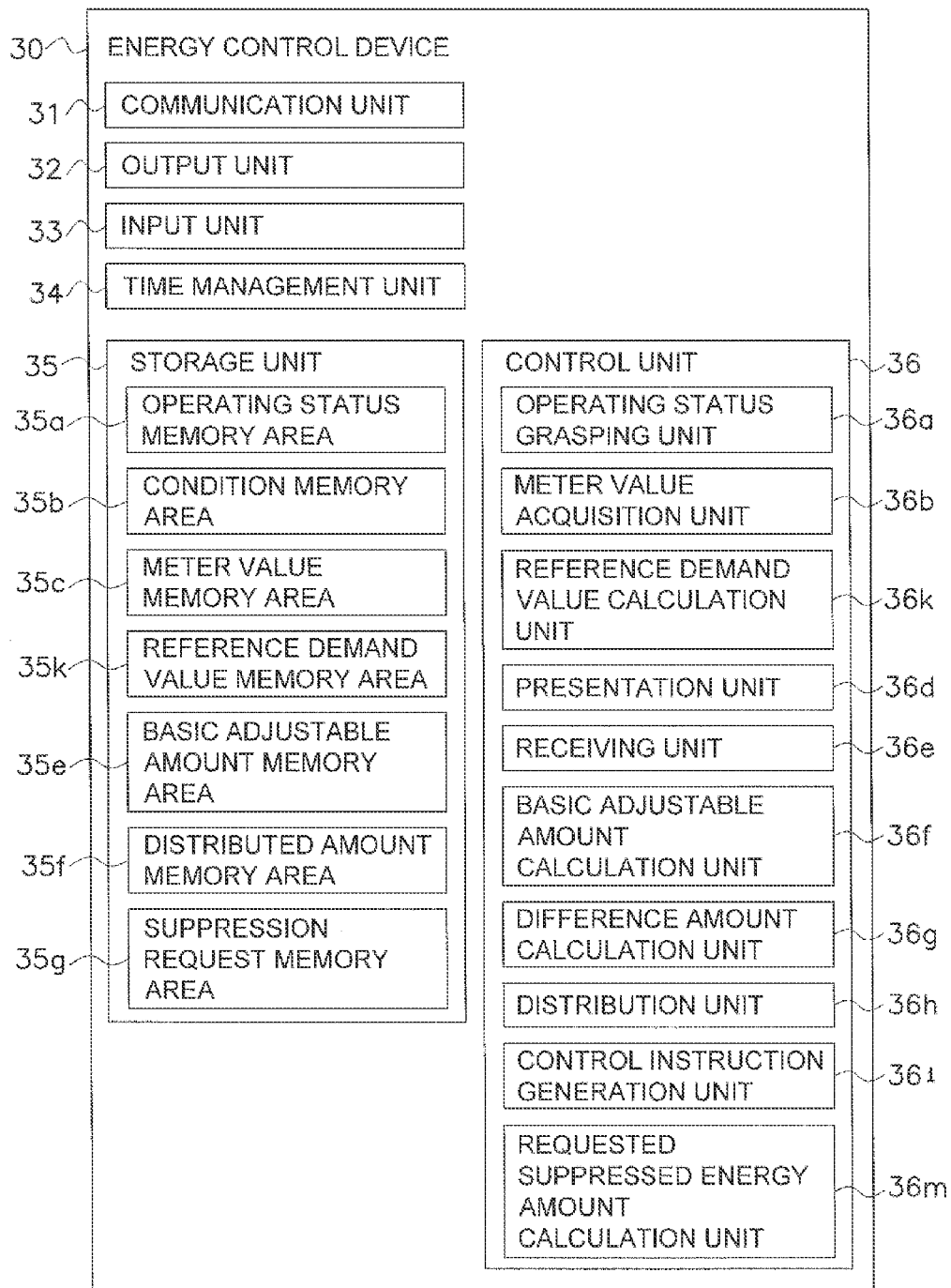
FIG. 11 is a general configuration diagram of the energy control device according to modified example 1L.

In the abovementioned embodiments, the reference adjustable amount calculation unit 36$c$ calculates the suppressible power as the reference adjustable amount of energy, and the presentation unit 36$d$ presents this to the energy management device 10, but there is no limitation to this. A reference demand value calculation unit 36$k$ for calculating a demand value achievable by the air conditioners 40, 40, . . . as a reference demand value may be provided instead of the reference adjustable amount calculation unit 36$c$ as in FIG. 11. "Demand value" indicates a maximum value of the amount of energy used per unit time at the property A. That is, the reference demand value calculation unit 36$k$ calculates the maximum power thought to be achievable (here, thought to be suppressible to this value) at property A during energy adjustment control. In other words, whereas the reference adjustable amount calculation unit 36$c$ of the abovementioned embodiment calculates the quantity that can be suppressed relative to the present power as a reference adjustable amount of energy, the reference demand value calculation unit 36$k$ in the present modified example calculates to which extent power can be suppressed as a reference demand value.

The reference demand value calculation unit 36$k$ calculates the reference demand value by a method as follows. When some air conditioners execute a defrosting operation or an oil return operation during calculation of the reference demand value, the first individual reference powers, which are equivalent to what the reference adjustable amount calculation unit 36$c$ calculates, are calculated respectively for these air conditioners 40, 40, . . . . When some air conditioners are in normal operation during calculation of the reference demand value, second individual reference powers, which are equivalent to what the reference adjustable amount calculation unit 36$c$ calculates, are calculated respectively for these air conditioners 40, 40, . . . . The reference demand value is calculated by summing up all of the calculated first and second individual reference powers. A combination of the reference demand value and a maintainable time being a condition used for calculation of the reference demand value are stored in a reference demand value memory area 35$k$. The presentation unit 36$d$ presents a plurality of combinations of reference demand values and maintainable times to the power company 1.

In addition to this, in the present modified example, the receiving unit 36$e$ of the energy control device 30 receives a requested demand value instead of a requested suppressed amount of energy from the power company 1. The requested demand value is a value greater to or equal to the reference demand value presented by the energy control devices 30, 30 at the properties A and B. In other words, the user is not requested to suppress energy above what was presented to the energy management device 10 as the reference demand value.

In the present modified example, the control unit 36 of the energy control device 30 further functions as a requested suppressed energy amount calculation unit 36$m$. The requested suppressed amount of energy is calculated by subtracting the requested demand value received by the receiving unit 36$e$ as information related to the requested suppressed amount of energy from the power used at the property A at the energy suppression request. The calculated requested suppressed amount of energy is combined with the suppression request time received by the receiving unit 36$e$ and is stored in the suppression request memory area 35$g$.

As previously described, the property A is not requested with a requested demand value to suppress energy above what was presented to the energy management device 10 as a reference demand value by the energy control device 30. In other words, the requested suppressed amount of energy calculated by the requested suppressed energy amount calculation unit 36$m$ is less than or equal to a value obtained by subtracting the reference demand value presented by the presentation unit 36$d$ to the power company 1 with the suppression request time received by the receiving unit 36$e$ from the power used at the property A at the energy suppression request.

This is further explained with a specific example.

For example, assume that the presentation unit 36$d$ presents to the power company 1 three combinations of 60 minutes and 80 kW, 30 minutes and 60 kW, and 15 minutes and 40 kW as combinations of maintainable times and reference demand values. In this case, if the suppression request time received by the receiving unit 36$e$ from the power company 1 is 30 minutes, a requested demand value is, for example, 80 kW, being a value greater than 60 kW presented as a reference demand value. At this time, if the power used at the property A at the time of receiving the energy suppression request is 100 kW, the requested suppressed amount of energy is calculated as being 20 kW by the requested suppressed energy amount calculation unit 36$m$. The calculated requested suppressed amount of energy of 20 kW is a value smaller than a value (40 kW) obtained by subtracting 60 kW presented as the reference demand value for a 30-minute maintainable time by the presentation unit 36$d$ from 100 kW being the power used at the property A at the time of receiving the energy suppression request.

Here, because the reference demand value is presented to the energy management device prior to the energy suppression request, a feasible energy suppression request is easily presented from the energy management device. As a result, the equipment can more easily respond immediately to the requested suppressed amount of energy. Suppression of the amount of energy also can be executed within an extent in which user comfort is not impaired.

Second Embodiment

An energy management system 200 according to a second embodiment of the present invention is described below while referring to the drawings.

(1) General Configuration of the Entirety of the Energy Management System 200

Figure 12:
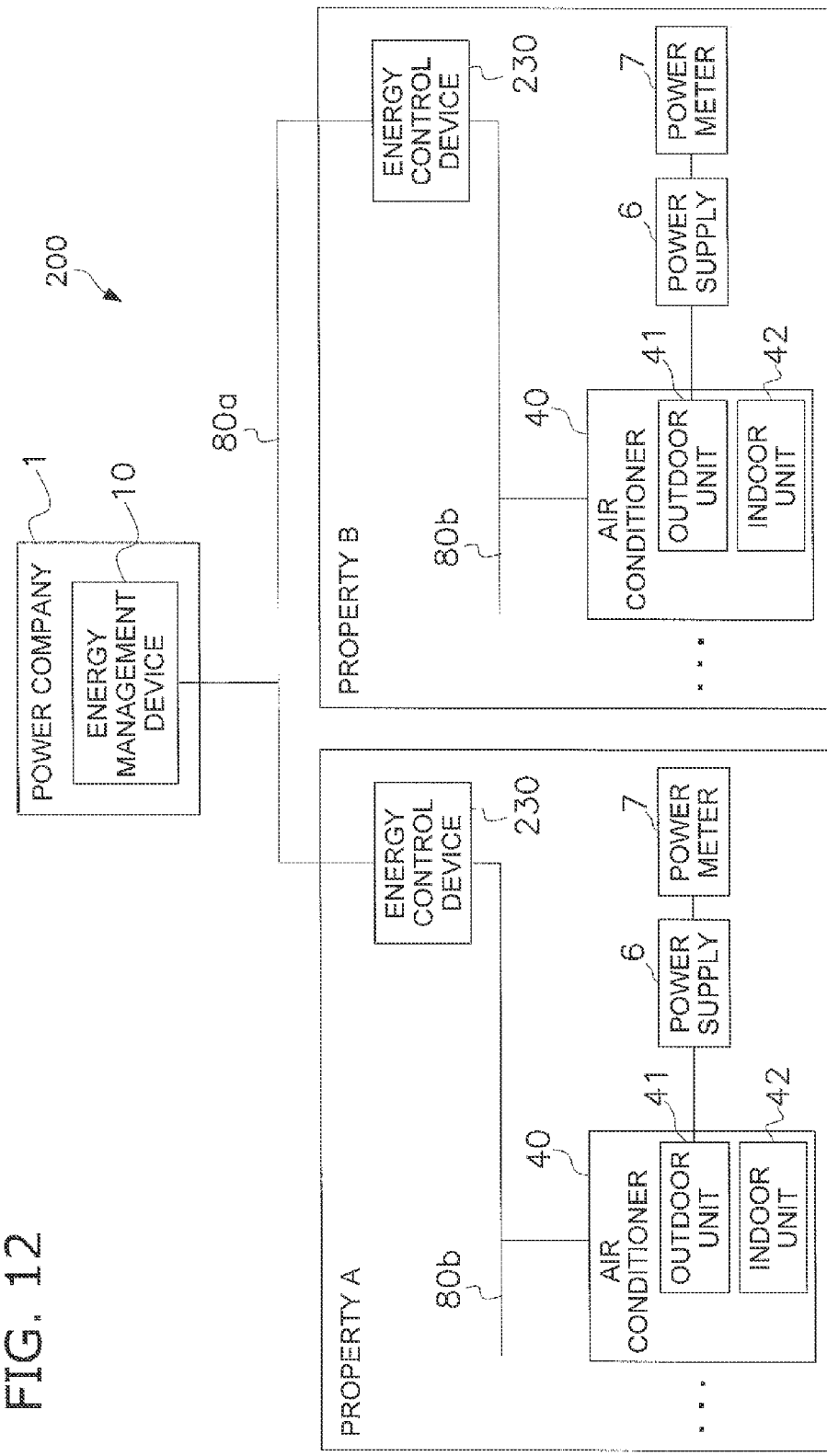
FIG. 12 is a general configuration diagram of the energy management system according to the second embodiment of the present invention.

FIG. 12 illustrates the energy management system 200 according to the present embodiment.

Description of the general configuration is omitted because this general configuration is the same as that of the energy management system 100 according to the first embodiment, except for an energy control device 230 at the properties A and B.

(2) Configuration of Each Device

Description of the energy management device 10 included in the energy management system 200 is omitted because it is the same as the energy management device 10 in the first embodiment.

The energy control device 230 is described.

(2-1) Configuration of the Energy Control Device

Figure 13:
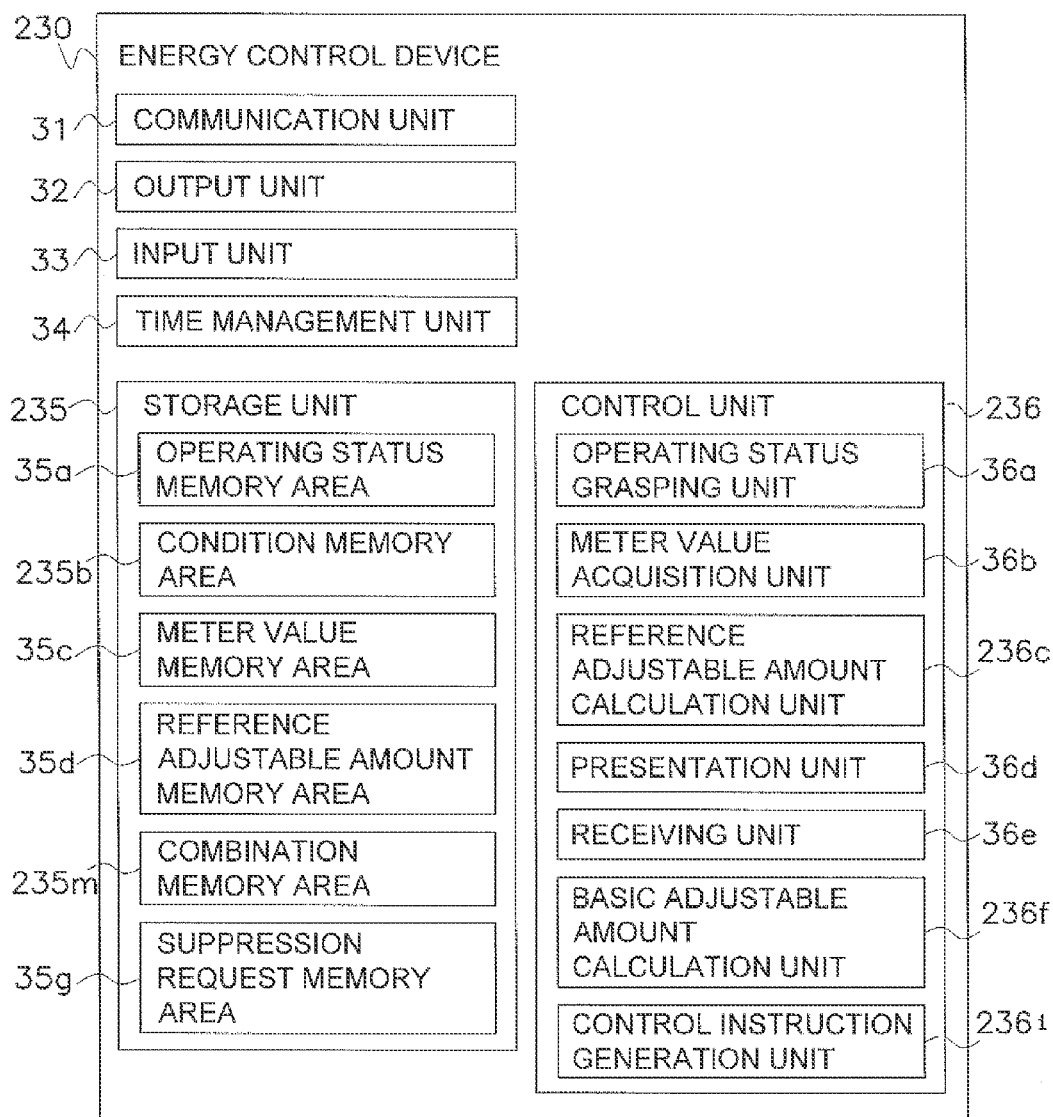
FIG. 13 is a general configuration diagram of the energy control device according to the second embodiment of the present invention.

FIG. 13 is a general configuration diagram of the energy control devices 230, 230.

The energy control devices 230, 230 placed at the properties A and B are described below using FIG. 13. The energy control device 230 placed at the property A is described in the description below. The energy control device 230 placed at the property B also has the same configuration.

The energy control device 230 mainly has a communication unit 31, an output unit 32, an input unit 33, a time management unit 34, a storage unit 235, and a control unit 236 as illustrated in FIG. 13. Except for the storage unit 235 and the control unit 236, descriptions of the communication unit 31, output unit 32, input unit 33, and time management unit 34 are omitted because these are the same as in the energy control device 30 of the first embodiment.

(2-1-1) Storage Unit

The storage unit 235 is configured with a hard disk, and the like, and has an operating status memory area 35a, a condition memory area 235b, a meter value memory area 35c, a reference adjustable amount memory area 35d, a combination memory area 235m, and a suppression request memory area 35g. Descriptions of the operating status memory area 35a, meter value memory area 35c, reference adjustable amount memory area 35d, and suppression request memory area 35g are omitted because these are the same as in the storage unit 35 of the energy control device 30 of the first embodiment.

(2-1-1-1) Condition Memory Area

Conditions for calculating a reference adjustable amount of energy and a basic adjustable amount of energy to be described later are stored for each air conditioner 40, 40, . . . in the condition memory area 235b. The conditions, specifically, are combinations of times for executing energy adjustment control (that is, maintainable times of energy adjustment control) (minutes) the operating capacities of the air conditioners 40, 40, . . . allowed during execution of the energy adjustment control (hereinafter referred to as "allowed operating capacity"), as illustrated in FIG. 9. A plurality of allowed operating capacities furthermore are provided in accordance with an intensity of control for suppressing energy. Here, three levels of "low," "moderate," and "high" are provided as intensities of energy suppression control. In the table in FIG. 9, the conditions of "moderate" intensity of energy suppression control are optimal conditions of allowed suppression intensity that is believed not to impair user comfort while sufficiently accomplishing suppression of the amount of energy. As opposed to this, the conditions of "low" intensity of energy suppression are conditions that suppress the amount of energy less than the conditions of the "moderate" intensity of energy suppression, in other words, are conditions with which comfort is more easily assured for the user. The conditions of "high" intensity of energy suppression are conditions that suppress the amount of energy more than the conditions of the "moderate" intensity of energy suppression, in other words, are conditions with which the amount of energy is more easily suppressed.

In the present embodiment, the allowed operating capacities are fixed values predefined for each air conditioner 40, 40, . . . , and the fact that there is no limitation to this is the same as with the conditions in the condition memory area 35b of the first embodiment.

(2-1-1-2) Combination Memory Area

A plurality of basic adjustable amounts of energy for each air conditioner 40, 40, . . . and a plurality of total basic adjustable amounts calculated for combinations of the basic adjustable amounts of energy for each air conditioner 40, 40, . . . calculated by a basic adjustable amount calculation unit 236f to be described later are stored in the combination memory area 235m. Information related to the combinations of basic adjustable amounts of energy serving as the basis of calculation of each total basic adjustable amount also is stored in relation with each total basic adjustable amount.

(2-1-2) Control Unit

The control unit is configured with a CPU, a ROM, a RAM, and the like. The control unit 236 mainly functions as an operating status grasping unit 36a, a meter value acquisition unit 36b, a reference adjustable amount calculation unit 236c, a presentation unit 36d, a receiving unit 36e, a basic adjustable amount calculation unit 236f, a control instruction generation unit 236i, and the like, by reading and executing programs stored in the abovementioned storage unit 235.

Except for the reference adjustable amount calculation unit 236c, basic adjustable amount calculation unit 236f, and control instruction generation unit 236i, descriptions of the operating status grasping unit 36a, meter value acquisition unit 36b, presentation unit 36d, and receiving unit 36e are omitted because these are the same as in the control unit 36 of the first embodiment.

(2-1-2-1) Reference Adjustable Amount Calculation Unit

The reference adjustable amount calculation unit 236c differs from the reference adjustable amount calculation unit 36c of the first embodiment in that the reference adjustable amount of energy is calculated using the conditions of "moderate" intensity of energy suppression control in FIG. 9 stored in the condition memory area 235b. Descriptions of the other points are omitted because these are the same as with the reference adjustable amount calculation unit 36c.

(2-1-2-2) Basic Adjustable Amount Calculation Unit

The basic adjustable amount calculation unit 236f differs from the basic adjustable amount calculation unit 36f of the first embodiment in that a plurality of basic adjustable amounts of energy are calculated using the conditions of "low," "moderate," and "high" intensity of energy suppression control with respect to maintainable times matching the suppression request time received by the receiving unit 36e. Calculation of the basic adjustable amount of energy by the basic adjustable amount calculation unit 236f is the same as that by the basic adjustable amount calculation unit 36f, except that a plurality of basic adjustable amounts of energy are calculated for each air conditioner 40, 40, . . . .

However, calculation of the total basic adjustable amount by the basic adjustable amount calculation unit 236f differs from that by the basic adjustable amount calculation unit 36f. Total basic adjustable amounts are calculated for all combinations of a plurality of basic adjustable amounts of energy calculated for each air conditioner 40, 40, . . . by the basic adjustable amount calculation unit 236f.

Specifically, for example, if three air conditioners 40, 40, . . . in normal operation are placed at the property A, and conditions of "low," "moderate," and "high" intensity of energy suppression control are provided in the condition memory area 235b for the respective air conditioners 40,

40, . . . then 27 (=3×3×3) total basic adjustable amounts are calculated. The number of combinations is further increased if an alternative in which energy adjustment is not executed is allowed.

The calculated basic adjustable amounts for each air conditioner 40, 40, . . . and the total basic adjustable amounts are stored in the combination memory area 235m. Information related to the combinations of basic adjustable amounts of energy serving as the basis of calculation of each total basic adjustable amount also is stored in relation with each total basic adjustable amount in the combination memory area 235m.

(2-1-2-3) Control Instruction Generation Unit

The control instruction generation unit 236i selects one total basic adjustable amount from a plurality of total basic adjustable amounts stored in the combination memory area 235m so that it becomes equal to the requested suppressed amount of energy. The control instruction generation unit 236i also instructs each air conditioner 40, 40, . . . to perform adjustment control of power with the basic adjustable amount of energy for each air conditioner 40, 40, . . . serving as basis of calculation of the one selected total basic adjustable amount. In other words, the control instruction generation unit 36i generates an adjustment control instruction for the air conditioners 40, 40, . . . to adjust the power by the respective basic adjustable amount of energy. The control instruction generation unit 36i furthermore transmits the adjustment control instruction to each air conditioner 40, 40, . . . and instructs execution thereof.

Here, "so that it becomes equal to the requested suppressed amount of energy" does not necessarily mean to be a complete match, and the selection may be executed so that a difference between the requested suppressed amount of energy and the total basic adjustable amount is smallest. It also becomes possible to respond assuredly to the energy suppression request of the power company 1 if a condition that the total basic adjustable amount is larger than the requested suppressed amount is added.

When there are a plurality of combinations by which the difference between the requested suppressed amount of energy and the total basic adjustable amount is smallest, a combination is selected in which there are few air conditioners 40, 40, . . . belonging to "high" intensity of energy suppression control and the ratio of air conditioners 40, 40, . . . belonging to "moderate" intensity of energy suppression control is high.

(3) Control Processing Performed in the Energy Management System 200

Figure 14:
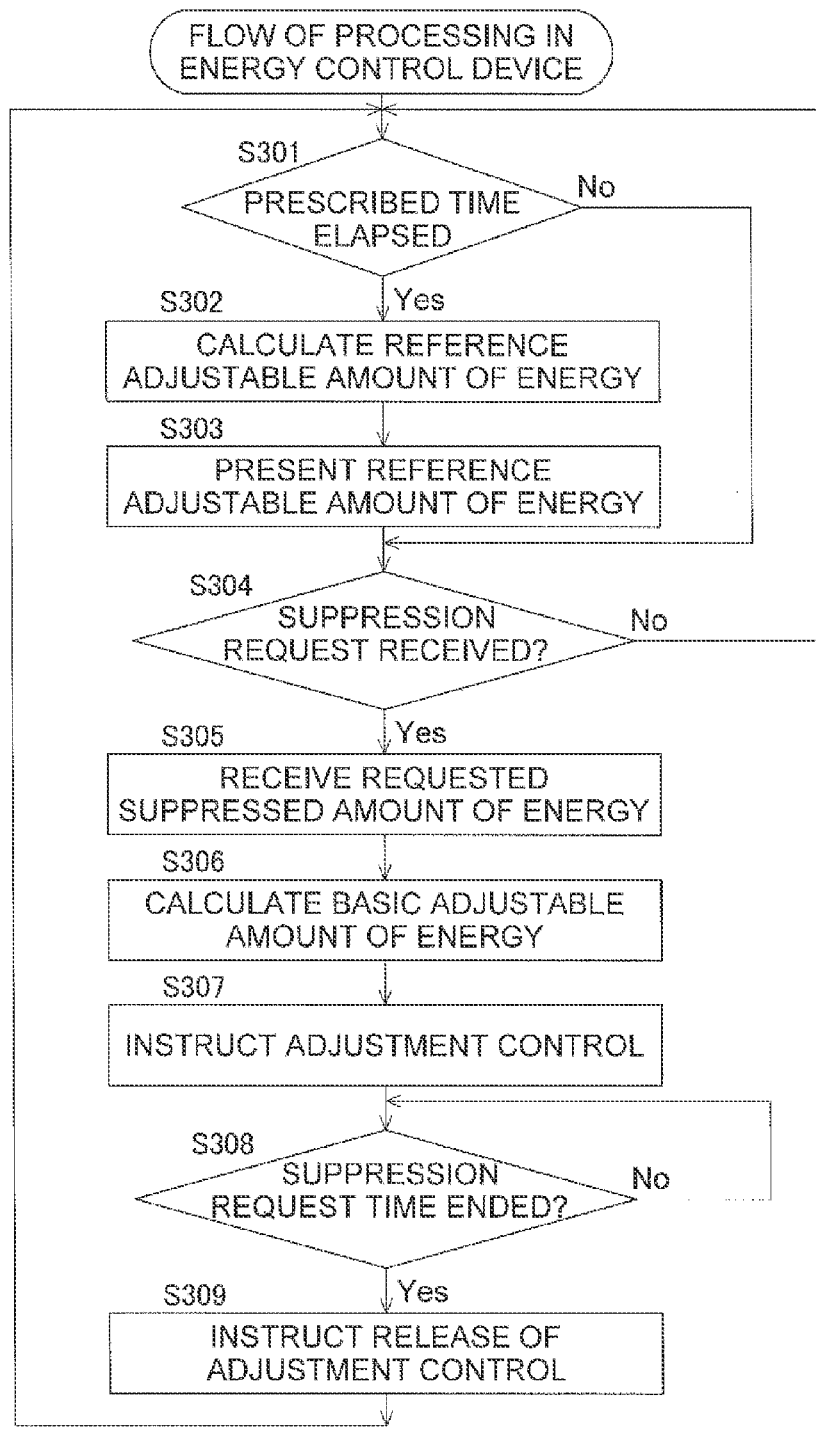
FIG. 14 is a flow chart illustrating the flow of processing in the energy control device according to the second embodiment of the present invention.

The flow of processing of energy adjustment control in the energy control device 230 is described below using FIG. 14.

First in step S301, the time management unit 34 determines whether a prescribed time, specifically, one hour, has elapsed since the reference adjustable amount calculation unit 236c previously calculated the reference adjustable amount of energy. The flow advances to step S302 when the prescribed time has elapsed, and the flow advances to step S304 when the prescribed time has not elapsed.

In step S302, the reference adjustable amount calculation unit 236c calculates a reference adjustable amount of energy. Specifically, the reference adjustable amount calculation unit 236c calculates an individual reference adjustable amount for each air conditioner 40, 40, . . . on the basis of a present operating status of each air conditioner 40, 40, . . . grasped by the operating status grasping unit 36a, a meter value of each air conditioner 40, 40, . . . stored in the meter value memory area 35c, and conditions of "moderate" intensity of energy suppression control among the conditions stored in the condition memory area 235b. The reference adjustable amount calculation unit 236c furthermore adds up the individual reference adjustable amounts for all of the air conditioners 40, 40, . . . and calculates a reference adjustable amount of energy. The calculated reference adjustable amount of energy is stored in the reference adjustable amount memory area 35d.

In step S303, the presentation unit 36d presents to the energy management device 10 a plurality of reference adjustable amounts of energy for each condition stored in the reference adjustable amount memory area 35d.

In step S304, it is determined whether an energy suppression request from the energy management device 10 was received by the receiving unit 36e. The flow moves to step S305 when it is determined to be received. Meanwhile, the flow returns to step S301 when it is determined not to be received.

In step S305, the suppression request time and the requested suppressed amount of energy received by the receiving unit 36e are stored in the suppression request memory area 35g.

In step S306, a basic adjustable amount of energy is calculated. Specifically, the basic adjustable amount calculation unit 236f calculates a plurality of basic adjustable amounts of energy respectively corresponding to the energy suppression intensities for each air conditioner 40, 40, . . . on the basis of the present operating status of each air conditioner 40, 40, . . . grasped by the operating status grasping unit 36a, the meter value of each air conditioner 40, 40, . . . stored in the meter value memory area 35c, the suppression request time stored in the suppression request memory area 35g, and the conditions stored in the condition memory area 235b. The basic adjustable amount calculation unit 236f furthermore calculates a plurality of total basic adjustable amounts for all combinations of a plurality of basic adjustable amounts of energy calculated for each air conditioner 40, 40, . . . . The calculated basic adjustable amounts of energy and the total basic adjustable amounts are stored in the combination memory area 235m. Information relates to the combinations of the basic adjustable amounts of energy serving as basis of calculation of each total basic adjustable amount also is stored in the combination memory area 235m in relation with each total basic adjustable amount.

In step S307, the control instruction generation unit 236i selects one total basic adjustable amount from the plurality of total basic adjustable amounts stored in the combination memory area 235m so that it becomes equal to the requested suppressed amount of energy. Specifically, the total basic adjustable amount with which the difference between the total basic adjustable amount and the requested suppressed amount of energy becomes smallest is selected. The control instruction generation unit 236i also generates for each air conditioner 40, 40, . . . an adjustment control instruction to adjust the power by the basic adjustable amount of energy for each air conditioner 40, 40, . . . serving as basis of calculation of the one selected total basic adjustable amount. The control instruction generation unit 236i then transmits the adjustment control instruction to each air conditioner 40, 40, . . . and instructs execution of energy adjustment control.

In step S308, the time management unit 34 determines whether the suppression request time has elapsed since instruction of adjustment control of power. If it is determined that the suppression request time has ended, in step S309 an instruction to release adjustment control is transmitted to each air conditioner 40, 40, . . . from the control instruction generation unit 236*i*, and the control flow then returns to step S301. Step S308 is iterated until it is determined that the suppression request time has elapsed.

(4) Features

4-1

In the present embodiment, an energy control device 30 adjusts an amount of energy of air conditioners 40, 40, . . . , being a plurality of pieces of equipment placed at a property A and comprises a receiving unit 36*e*, a basic adjustable amount calculation unit 236*f*, and a control instruction generation unit 236*i*. The receiving unit 36*e* receives an energy suppression request including information related to a requested suppressed amount of energy that is an amount of energy to be suppressed at the property A. The basic adjustable amount calculation unit 236*f* calculates, upon receipt of the energy suppression request, a basic adjustable amount of energy for each air conditioner 40, 40, . . . independently of the requested suppressed amount of energy, on the basis of an operating status of the air conditioner 40, 40, . . . at the time when the energy suppression request is received. The control instruction generation unit 236*i* instructs the air conditioners 40, 40, . . . to perform the energy amount adjustment control so that a total of suppressed amounts of energy at the property A becomes equal to the requested suppressed amount of energy on the basis of the basic adjustable amount of energy for each air conditioner 40, 40, . . . .

Here, the basic adjustable amount of energy for each air conditioner 40, 40, . . . based on the operating status of the air conditioner 40, 40, . . . at the time of receiving the energy suppression request is calculated independently of the requested suppressed amount of energy upon receipt of the energy suppression request, and energy adjustment of each air conditioner 40, 40, . . . is performed on the basis of the basic adjustable amount of energy. Because the basic adjustable amount of energy is a value that is calculated as adjustable upon considering the operating status of the air conditioners 40, 40, . . . at the time of receiving the energy suppression request, the air conditioners 40, 40, . . . can suppress power by the requested suppressed amount of energy quickly. Because the conditions used for calculating the basic adjustable amount of energy are values that are predetermined so that an influence on the indoor environment of the user is brought to within an allowed range, user comfort also is unlikely to be impaired when suppression control is executed using these conditions.

4-2

In the present embodiment, the basic adjustable amount calculation unit 236*f* calculates a plurality of basic adjustable amounts of energy for each air conditioner 40, 40, . . . . The control instruction generation unit 236*i* instructs the air conditioners 40, 40, . . . to perform the energy amount adjustment control using a combination of the basic adjustable amounts of energy for each air conditioner 40, 40, . . . by which a difference between a total of the basic adjustable amounts of energy for each air conditioner 40, 40, . . . and the requested suppressed amount of energy is smallest.

Here, because the energy amount adjustment control is executed using a combination of the basic adjustable amounts of energy by which the difference with the requested suppressed amount of energy is smallest, it is possible to respond with good precision to the requested suppressed amount of energy immediately after receiving the energy suppression request.

(5) Modified Examples

An embodiment of the present invention is described above using the drawings, but the specific configuration is not limited to the abovementioned embodiment, and modifications are possible within a scope not deviating from the gist of the invention.

Modified examples of the present embodiment are illustrated below. The gist of the modified examples 1F to 1L of the first embodiment applies also to the second embodiment, in addition to the modified examples 2A to 2D below. A plurality of modified examples may be suitably combined.

(5-1) Modified Example 2A

In the abovementioned embodiment, when there are a plurality of combinations by which the difference between the requested suppressed amount of energy and the total basic adjustable amount is smallest, the control instruction generation unit 236*i* finally selects a combination in accordance with a ratio of air conditioners 40, 40, . . . belonging to "high" or "moderate" intensity of energy suppression control, but there is no limitation to this. For example, the control instruction generation unit 236*i* may select a combination on the basis of information of user comfort/discomfort associated with the air conditioners 40, 40, . . . otherwise than in the abovementioned embodiment.

This is described below on the basis of FIG. 15.

Figure 15:
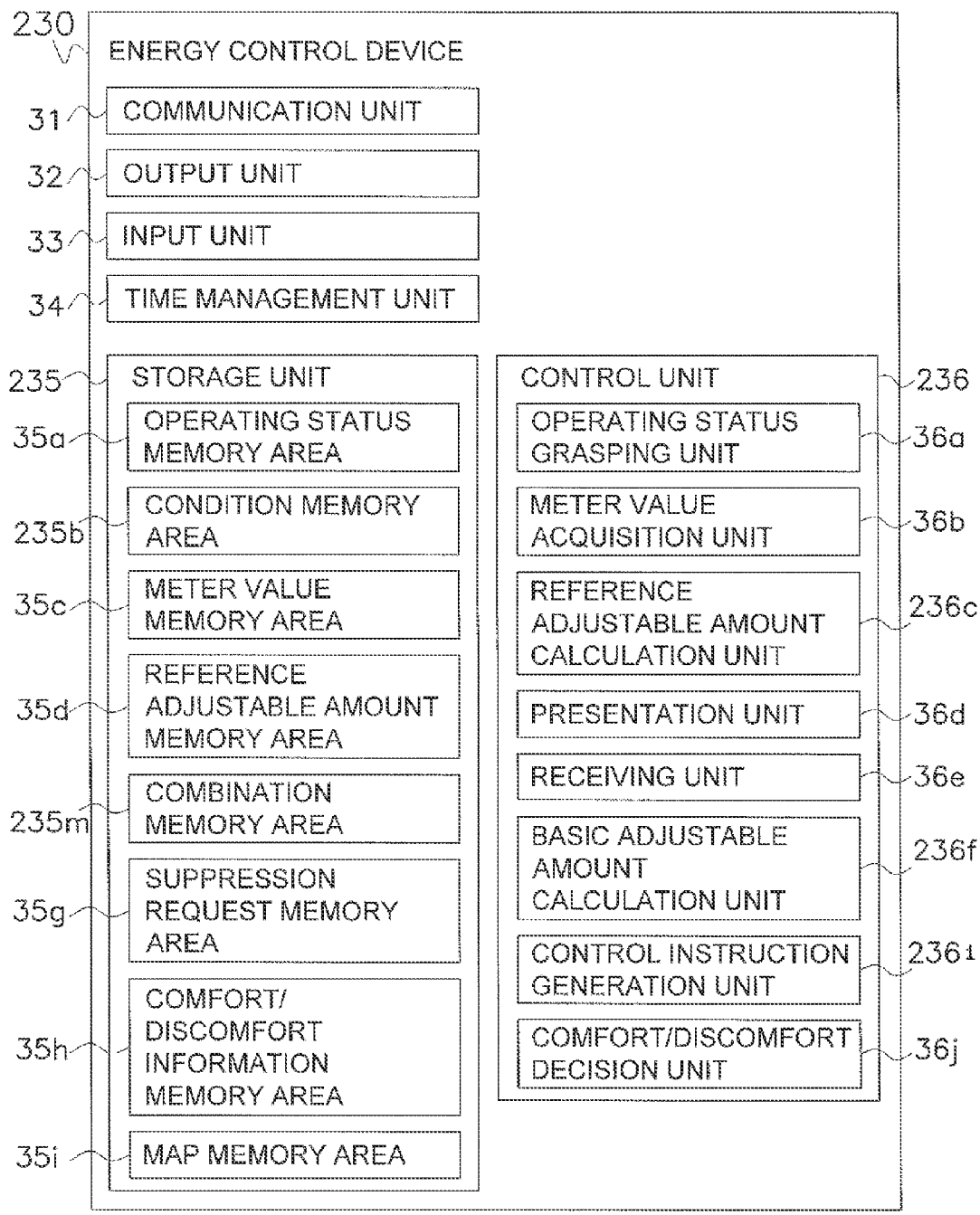
FIG. 15 is a general configuration diagram of the energy control device according to modified example 2A.

The storage unit 35 further has a comfort/discomfort information memory area 35*h* for storing information regarding user comfort/discomfort for each air conditioner 40, 40, . . . , and a map memory area 35*i* for storing various kinds of maps, as illustrated in FIG. 15. The information regarding user comfort/discomfort may be information that is directly input via an input unit 33 by the user when the user feels uncomfortable and is stored in the comfort/discomfort information memory area 35*h*, or may be information that is decided on the basis of a set temperature or a degree of deviation between a set temperature and an indoor temperature, and/or the like. A specific example is described here concerning the latter case.

When the user comfort/discomfort is decided on the basis of a set temperature or a degree of deviation between a set temperature and an indoor temperature, and/or the like, the control unit 236 of the energy control device 230 further fictions as a comfort/discomfort decision unit 36*j* for deciding on user comfort/discomfort, as illustrated in FIG. 15.

For example, the comfort/discomfort decision unit 36*j* may decide on user comfort/discomfort for each indoor unit 42, 42, . . . and/or outdoor unit 41, 41, . . . . . . A combination of basic adjustable amounts of energy may be decided on this basis so that the conditions for indoor units 42, 42, . . . and/or outdoor units 41, 41, . . . where the users feel uncomfortable are of "low" energy suppression intensity and conditions for indoor units 42, 42, . . . and/or outdoor units 41, 41, . . . where the user feels comfortable are of "high" energy suppression intensity. A specific example of the decision of user comfort/discomfort is illustrated in modified example 1A.

In the present modified example, because the energy adjustment control is performed on the basis of user comfort/discomfort when there are a plurality of combinations by which the difference between the requested suppressed amount of energy and the total basic adjustable amounts of energy are smallest, it is possible to respond to the energy suppression request without impairing user comfort.

(5-2) Modified Example 2B

In the abovementioned embodiment, the basic adjustable amount calculation unit 236f calculates total basic adjustable amounts for all combinations of a plurality of calculated basic adjustable amounts of energy for the air conditioners 40, 40, . . . , but there is no limitation to this.

For example, the basic adjustable amount calculation unit 236f may calculate a total basic adjustable amount only for a combination in which the intensity of energy suppression control is "moderate."

In this case, the control instruction generation unit 236i recalculates the total basic adjustable amount when the difference between the requested suppressed amount of energy and the total basic adjustable amount is larger than a prescribed allowed amount (for example, 5 kW).

Specifically, the basic adjustable amount of energy used for calculating the total basic adjustable amount is changed, for example, in ascending order of the air conditioners 40, 40, . . . regarding consumed power at the time of the energy suppression request, to the basic adjustable amount of energy calculated using conditions for "high" or "low" intensity of energy suppression control. The difference between the requested suppressed amount of energy and the recalculated total basic adjustable amount is calculated again. This is iterated until the difference between the requested suppressed amount of energy and the total basic adjustable amount becomes less than or equal to the prescribed allowed amount.

In the present modified example, because a combination of basic adjustable amounts of energy is selected with a starting point of an combination of conditions of optimal allowed suppression intensity (conditions in which the intensity of energy suppression control is "moderate"), and an energy adjustment control instruction is generated on the basis thereof, energy adjustment control suppressing energy by the requested suppressed amount of energy is thereby easily executed rapidly while maintaining user comfort.

(5-3) Modified Example 2C

In the abovementioned modified example 2A, the comfort/discomfort information memory area 35h and the map memory area 35i are described as elements of the storage unit 235, but user comfort/discomfort may also be determined by a method as follows, and, based on that, the control instruction generation unit 236i may select a combination of basic adjustable amounts of energy.

For example, an air-conditioned space in which air conditioners 40, 40, . . . are installed may be virtually partitioned into a plurality of partitions, partitions having high necessity and partitions having low necessity of air conditioning by the air conditioners 40, 40, . . . may be stored in advance in a storage unit 235, and one combination of basic adjustable amounts of energy may be selected on the basis of that standard. That is, the control instruction generation unit 236i selects a combination of basic adjustable amounts of energy so that the power is not suppressed so much in the partitions having high necessity of air conditioning and the power is suppressed to the extent possible in the partitions having low necessity of air conditioning. In this case, the storage unit 235 has a plan view data memory area (not illustrated) for storing plan view data rendering the air-conditioned space in which air conditioners 40, 40, . . . are placed and the plurality of partitions in two dimensions. The plurality of partitions are established, for example by an operator, or the like.

Instead of partitioning the air-conditioned space as mentioned above, air conditioners 40, 40, . . . having high operating rate and air conditioners 40, 40, . . . having low operating rate of the air conditioners 40, 40, . . . may also be stored in advance in the storage unit 235 and a combination of basic adjustable amounts of energy may be selected using this.

A future operating state (operating time, or the like) of the air conditioners 40, 40, . . . may also be predicted on the basis of the operating status of the air conditioners 40, 40, . . . , and a combination of basic adjustable amounts of energy may be selected on the basis of the future operating state.

In the present modified example as well, it is easy to respond to the energy suppression request without impairing user comfort.

(5-4) Modified Example 2D

When the control unit 236 functions as a comfort/discomfort decision unit 36j for deciding on user comfort/discomfort for each outdoor unit 41, 41, . . . and/or each indoor unit 42, 42, . . . as described in modified example 2A, the basic adjustable amount calculation unit 236f may exclude outdoor units 41, 41, . . . and/or indoor units 42, 42, . . . having a large number of rank of user comfort/discomfort from being object of the calculation of the basic adjustable amount of energy. The control instruction generation unit 236i may also exclude outdoor units 41, 41, . . . and/or indoor units 42, 42, . . . having a large number of rank of user comfort/discomfort from being object of energy adjustment.

Here, it is easy to respond to the energy suppression request without impairing user comfort.

INDUSTRIAL APPLICABILITY

The present invention is applicable to various kinds of energy control apparatus for suppressing an amount of energy on receipt of transmission of prescribed information from an energy management device.

What is claimed is:

1. An energy control device adapted to adjust an amount of energy of a plurality of pieces of equipment placed at a property, the energy control device comprising:
   a receiving unit configured to receive an energy suppression request including information related to a requested suppressed amount of energy that is an amount of energy to be suppressed at the property;
   a basic adjustable amount calculation unit configured to calculate, upon receipt of the energy suppression request, a basic adjustable amount of energy for each of the pieces of equipment independently of the requested suppressed amount of energy based on an operating status of the piece of equipment at the time when the energy suppression request is received;
   a control instruction generation unit configured to instruct the equipment to perform energy amount adjustment control so that a total of suppressed amounts of energy at the property becomes equal to the requested suppressed amount of energy based on the basic adjustable amount of energy for each of the pieces of equipment;
   a difference amount calculation unit configured to calculate as an energy difference amount a difference between a total of the basic adjustable amounts of energy for each of the pieces of equipment and the requested suppressed amount of energy; and a distribution unit configured to distribute the energy difference amount to the equipment, the control instruction generation unit being further configured to instruct the equipment to perform the energy amount adjustment control based on the basic adjustable amount of energy and a result of the distribution of the energy difference amount performed by the distribution unit.

2. The energy control device according to claim 1, wherein the basic adjustable amount calculation unit is further configured to calculate a plurality of said basic adjustable amounts of energy for each of the pieces of equipment, the difference amount calculation unit is further configured to calculate a plurality of said energy difference amounts from differences between totals of a plurality of the basic adjustable amounts of energy and the requested suppressed amount of energy, and the distribution unit is further configured to distribute to the equipment a smallest energy difference amount of the plurality of said energy difference amounts.

3. The energy control device according to claim 2, further comprising a first storage unit configured to store information of user comfort/discomfort associated with the equipment, the distribution unit is further configured to distribute the energy difference amount to the equipment based on the information of user comfort/discomfort.

4. The energy control device according to claim 2, further comprising a comfort/discomfort decision unit configured to decide on user comfort/discomfort associated with the equipment, the distribution unit is further configured to distribute the energy difference amount to the equipment based on the information if user comfort/discomfort.

5. The energy control device according to claim 1, further comprising a second storage unit configured to store information related to an energy supply-demand contract with an energy supplier supplying energy to the property, the energy suppression request including information related to the requested suppressed amount of energy calling the information related to the requested suppressed amount of energy defined in the energy supply-demand contract from the second storage unit.

6. The energy control device according to claim 1, further comprising a first storage unit configured to store information of user comfort/discomfort associated with the equipment, the distribution unit is further configured to distribute the energy difference amount to the equipment based on the information of user comfort/discomfort.

7. The energy control device according to claim 1, further comprising a comfort/discomfort decision unit configured to decide on user comfort/discomfort associated with the equipment, the distribution unit is further configured to distribute the energy difference amount to the equipment based on the information of user comfort/discomfort.

8. An energy control device adapted to adjust an amount of enemy of a plurality of pieces of equipment placed at a property, the energy control device comprising:

a receiving unit configured to receive an energy suppression request including information related to a requested suppressed amount of energy that is an amount of energy to be suppressed at the property;

a basic adjustable amount calculation unit configured to calculate, upon receipt of the energy suppression request, a basic adjustable amount of energy for each of the pieces of equipment independently of the requested suppressed amount of energy based on an operating status of the piece of equipment at the time when the energy suppression request is received; and a control instruction generation unit configured to instruct the equipment to perform energy amount adjustment control so that a total of suppressed amounts of energy at the property becomes equal to the requested suppressed amount of energy based on the basic adjustable amount of energy for each of the pieces of equipment, the basic adjustable amount calculation unit being further configured to calculate a plurality of said basic adjustable amounts of energy for each of the pieces of equipment, and the control instruction generation unit being further configured to instruct the equipment to perform the energy amount using a combination of the basic adjustable amounts of energy for each of the pieces of equipment in which a difference between a total of the basic adjustable amounts of energy for each of the pieces of equipment and the requested suppressed amount of energy is smallest.

9. The energy control device according to claim 8, further comprising a first storage unit configured to store information of user comfort/discomfort associated with the equipment, wherein the control instruction generation unit, when there are a plurality of combinations of the basic adjustable amounts of energy for each of the pieces of equipment in which the difference between the total of the basic adjustable amounts of energy for each of the pieces of equipment and the requested suppressed amount of energy is smallest, is further configured to decide on one combination of the basic adjustable amounts of energy on the basis of the information of user comfort/discomfort, and to instruct the equipment to perform the energy amount adjustment control.

10. The energy control device according to claim 8, further comprising a comfort/discomfort decision unit configured to decide on user comfort/discomfort associated with the equipment, wherein the control instruction generation unit, when there are a plurality of combinations of the basic adjustable amounts of energy for each of the pieces of equipment in which the difference between the total of the basic adjustable amounts of energy for each of the pieces of equipment and the requested suppressed amount of energy is smallest, is further configured to decide on one combination of the basic adjustable amounts of energy on the basis of the information of user comfort/discomfort, and to instruct the equipment to perform the energy amount adjustment control.

11. An energy control device adapted to adjust an amount of energy of a plurality of pieces of equipment placed at a property, the energy control device comprising:

a receiving unit configured to receive an energy suppression request including information related to a requested suppressed amount of energy that is an amount of energy to be suppressed from an energy management device;

a basic adjustable amount calculation unit configured to calculate, upon receipt of the energy suppression request, a basic adjustable amount of energy for each of the pieces of equipment independently of the requested suppressed amount of energy based on an operating status of the piece of equipment at the time when the energy suppression request is received;

a control instruction generation unit configured to instruct the equipment to perform energy amount adjustment control so that a total of suppressed amounts of energy at the property becomes equal to the requested suppressed amount of energy based on the basic adjustable amount of energy for each of the pieces of equipment;

a reference adjustable amount calculation unit configured to calculate as a reference adjustable amount of energy a total of adjustable amounts of energy of the equipment in a first operating status; and a presentation unit configured to present the reference adjustable amount of energy to the energy management device prior to the energy suppression request.

12. The energy control device according to claim 11, wherein
the requested suppressed amount of energy is less than or equal to the reference adjustable amount of energy.

13. An energy control device adapted to adjust an amount of energy of a plurality of pieces of equipment placed at a property, the energy control device comprising:

a receiving unit configured to receive an energy suppression request including information related to a requested suppressed amount of energy that is an amount of energy to be suppressed at the property from an energy management device;

a basic adjustable amount calculation unit configured to calculate, upon receipt of the energy suppression request, a basic adjustable amount of energy for each of the pieces of equipment independently of the requested suppressed amount of energy based on an operating status of the piece of equipment at the time when the energy suppression request is received;

a control instruction generation unit configured to instruct the equipment to perform energy amount adjustment control so that a total of suppressed amounts of energy at the property becomes equal to the requested suppressed amount of energy based on the basic adjustable amount of energy for each of the pieces of equipment;

a reference demand value calculation unit configured to calculate as a reference demand value a demand value achievable by the equipment in a first operating status; and a presentation unit configured to present the reference demand value to the energy management device prior to the energy suppression request.

14. The energy control device according to claim 13, wherein
the requested suppressed amount of energy is less than or equal to a value obtained by subtracting the reference demand value from an amount of energy being used by the equipment at the time when the energy suppression request is received.

15. The energy control device according to claim 8, further comprising
a second storage unit configured to store information related to an energy supply-demand contract with an energy supplier supplying energy to the property,
the energy suppression request including information related to the requested suppressed amount of energy calling the information related to the requested suppressed amount of energy defined in the energy supply-demand contract from the second storage unit.

* * * * *

UNITED STATES PATENT AND TRADEMARK OFFICE
CERTIFICATE OF CORRECTION

Page 1 of 1

PATENT NO. : 9,459,644 B2
APPLICATION NO. : 14/371710
DATED : October 4, 2016
INVENTOR(S) : Nanae Kinugasa et al.

It is certified that error appears in the above-identified patent and that said Letters Patent is hereby corrected as shown below:

Claim 11 in Column 37, Line 4, reads:
"amount of energy to be suppressed from an energy management device;"

Should read:
-- amount of energy to be suppressed at the property from an energy management device; --

Signed and Sealed this
Ninth Day of May, 2017

Michelle K. Lee
*Director of the United States Patent and Trademark Office*